US011216190B2

(12) United States Patent
Yang et al.

(10) Patent No.: US 11,216,190 B2
(45) Date of Patent: Jan. 4, 2022

(54) SYSTEMS AND METHODS FOR I/O TRANSMISSIONS IN QUEUE PAIR-BASED NVMEOF INITIATOR-TARGET SYSTEM

(71) Applicant: Samsung Electronics Co., Ltd., Suwon-si (KR)

(72) Inventors: Zhengyu Yang, San Diego, CA (US); Nithya Ramakrishnan, San Diego, CA (US); Allen Russell Andrews, El Cajon, CA (US); Sudheendra G. Sampath, San Diego, CA (US); T. David Evans, San Diego, CA (US); Clay Mayers, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,928

(22) Filed: Aug. 9, 2019

(65) Prior Publication Data
US 2020/0387312 A1 Dec. 10, 2020

Related U.S. Application Data

(60) Provisional application No. 62/859,562, filed on Jun. 10, 2019.

(51) Int. Cl.
*G06F 3/06* (2006.01)
*G06F 13/16* (2006.01)
*G06F 13/42* (2006.01)

(52) U.S. Cl.
CPC .......... *G06F 3/0613* (2013.01); *G06F 3/0631* (2013.01); *G06F 3/0659* (2013.01);
(Continued)

(58) Field of Classification Search
CPC .... G06F 3/0613; G06F 3/0631; G06F 3/0659; G06F 3/0679; G06F 13/1642;
(Continued)

(56) References Cited

U.S. PATENT DOCUMENTS 5,592,672 A   1/1997  Grewal et al.
6,438,138 B1 * 8/2002  Kamiya .............. H04L 12/5602
                                              370/232
(Continued)

FOREIGN PATENT DOCUMENTS

CN    106254272 A    12/2016
JP       6289631      2/2018
WO   2014050125 A1   4/2014

OTHER PUBLICATIONS

Wenyu Gao, Jianxin Wang, Jianer Chen and Songqiao Chen, "PFED: a prediction-based fair active queue management algorithm," 2005 International Conference on Parallel Processing (ICPP'05), Oslo, Norway, 2005, pp. 485-491, doi: 10.1109/ICPP.2005.63 (Year: 2005).*

(Continued)

*Primary Examiner* — Reginald G Bragdon
*Assistant Examiner* — Aaron D Ho
(74) *Attorney, Agent, or Firm* — Lewis Roca Rothgerber Christie LLP

(57) ABSTRACT

A system and method for managing input output queue pairs. In some embodiments, the method includes calculating a system utilization ratio, the system utilization ratio being a ratio of: an arrival rate of input output requests, to a service rate; determining whether: the system utilization ratio has exceeded a first threshold utilization during a time period exceeding a first threshold length, and adding a new queue pair is expected to improve system performance; and in response to determining: that the system utilization ratio has exceeded the first threshold utilization during a time period
(Continued)

exceeding the first threshold length, and that adding a new queue pair is expected to improve system performance: adding a new queue pair.

20 Claims, 26 Drawing Sheets

(52) U.S. Cl.
CPC ........ *G06F 3/0679* (2013.01); *G06F 13/1689* (2013.01); *G06F 13/4291* (2013.01); *G06F 2213/0026* (2013.01)

(58) Field of Classification Search
CPC ............. G06F 13/1673; G06F 13/1689; G06F 13/4291; G06F 2213/0026
USPC ............. 710/52, 54, 56, 57, 59, 60; 711/103
See application file for complete search history.

(56) References Cited

U.S. PATENT DOCUMENTS

| | | | |
|---|---|---|---|
| 6,683,875 B1* | 1/2004 | Byham | H04L 49/351 370/230 |
| 6,986,139 B1 | 1/2006 | Kubo | |
| 7,289,498 B2 | 10/2007 | Yu et al. | |
| 7,448,044 B1* | 11/2008 | Rust | G06F 13/385 709/203 |
| 8,031,729 B2 | 10/2011 | Elzur | |
| 8,589,941 B2* | 11/2013 | Cardona | H04L 61/2015 718/105 |
| 8,638,664 B2 | 1/2014 | Shankar et al. | |
| 8,640,128 B2 | 1/2014 | Cardona et al. | |
| 9,021,138 B2 | 4/2015 | Dabagh et al. | |
| 9,152,448 B2 | 10/2015 | Wang et al. | |
| 9,459,904 B2 | 10/2016 | Mehta et al. | |
| 9,571,426 B2* | 2/2017 | Agarwal | H04L 47/2475 |
| 9,785,356 B2 | 10/2017 | Huang | |
| 9,800,523 B2 | 10/2017 | Guan et al. | |
| 9,804,780 B2 | 10/2017 | Oe et al. | |
| 9,979,678 B2 | 5/2018 | Huang et al. | |
| 10,069,903 B2 | 9/2018 | Sorenson, III et al. | |
| 10,089,144 B1 | 10/2018 | Nagpal et al. | |
| 10,127,177 B2 | 11/2018 | Tamir et al. | |
| 10,142,231 B2 | 11/2018 | Vasudevan | |
| 10,637,817 B2 | 4/2020 | Kuo et al. | |
| 10,671,302 B1 | 6/2020 | Aggarwal et al. | |
| 10,757,180 B2 | 8/2020 | Hodges et al. | |
| 2002/0124104 A1 | 9/2002 | Rappaport et al. | |
| 2003/0076849 A1* | 4/2003 | Morgan | H04L 47/805 370/412 |
| 2005/0138170 A1 | 6/2005 | Cherkasova et al. | |
| 2006/0064497 A1 | 3/2006 | Bejerano et al. | |
| 2006/0161924 A1 | 7/2006 | Di Gregorio | |
| 2008/0216087 A1 | 9/2008 | Dillenberger et al. | |
| 2009/0161684 A1* | 6/2009 | Voruganti | H04L 49/9078 370/412 |
| 2010/0157964 A1 | 6/2010 | Yoon | |
| 2011/0044338 A1* | 2/2011 | Stahl | H04L 12/2834 370/392 |
| 2011/0142064 A1* | 6/2011 | Dubal | H04L 47/125 370/412 |
| 2011/0153935 A1* | 6/2011 | Li | H04L 45/00 711/118 |
| 2011/0191011 A1* | 8/2011 | McBride | H04W 28/06 701/117 |
| 2012/0072627 A1 | 3/2012 | Droux et al. | |
| 2012/0079495 A1* | 3/2012 | Conti | G06F 9/526 718/104 |
| 2014/0274011 A1* | 9/2014 | Jain | H04W 8/22 455/418 |
| 2014/0325524 A1* | 10/2014 | Zangaro | G06F 9/5083 718/105 |
| 2014/0337540 A1 | 11/2014 | Johnson et al. | |
| 2015/0233983 A1 | 8/2015 | Siebel et al. | |
| 2016/0301610 A1 | 10/2016 | Amit et al. | |
| 2017/0031610 A1 | 2/2017 | Regester et al. | |
| 2017/0083252 A1 | 3/2017 | Singh et al. | |
| 2017/0168715 A1 | 6/2017 | Eshwarappa et al. | |
| 2017/0315840 A1 | 11/2017 | Yu et al. | |
| 2018/0191867 A1 | 7/2018 | Siebel et al. | |
| 2018/0285021 A1* | 10/2018 | Akaike | G06F 3/0611 |
| 2018/0349026 A1* | 12/2018 | Richter | G06F 3/061 |
| 2018/0349300 A1* | 12/2018 | Bubb | G06F 3/0673 |
| 2018/0359318 A1 | 12/2018 | Rogers et al. | |
| 2019/0042326 A1 | 2/2019 | Chilikin et al. | |
| 2019/0042331 A1 | 2/2019 | McDonnell et al. | |
| 2019/0042388 A1 | 2/2019 | Wang et al. | |
| 2019/0095491 A1 | 3/2019 | Bhattacharjee et al. | |
| 2019/0163764 A1 | 5/2019 | Ioannou et al. | |
| 2019/0182316 A1 | 6/2019 | Hodges et al. | |
| 2019/0196969 A1 | 6/2019 | Yang et al. | |
| 2019/0354406 A1* | 11/2019 | Ganguli | G06F 9/45558 |
| 2020/0162385 A1 | 5/2020 | Thiagarajan et al. | |

OTHER PUBLICATIONS

Allen B. Downey, "Using Queue Time Predictions for Processor Allocation", EECS Department University of California, Berkeley, Technical Report No. UCB/CSD-97-929 (Year: 1997).*
Guan, L. , Awan, I.U. , Phillips, L. , Grigg, A. , Dargie, W. (2009). "Performance analysis of a threshold-based discrete-time queue using maximum entropy". Simulation Modelling Practice and Theory. 17, 558-568 (Year: 2009).*
Hu, Q., Sun, Y. & Han, J. An efficient scheduling algorithm for input-queued switches. J. of Electron.(China) 24, 251-256 (2007). https://doi.org/10.1007/s11767-006-0111-8 (Year: 2007).*
Yuan Sun, Qingsheng Hu, Jiangtao Han and Zhigong Wang, "A self-adaptive threshold based scheduling algorithm for input-queued switches," 2006 Workshop on High Performance Switching and Routing, Poznan, 2006, pp. 4 pp. -, doi: 10.1109/HPSR.2006.1709741. (Year: 2006).*
A. K. Choudhury and E. L. Hahne, "Dynamic queue length thresholds for shared-memory packet switches," in IEEE/ACM Transactions on Networking, vol. 6, No. 2, pp. 130-140, Apr. 1998, doi: 10.1109/90.664262. (Year: 1998).*
H. Li and T. Yang, "Queues with a variable number of servers," European Journal of Operational Research, vol. 124, No. 3, pp. 615-628, 2000. (Year: 2000).*
H. Xiao and G. Zhang, "The queuing theory application in bank service optimization," 2010 International Conference on Logistics Systems and Intelligent Management (ICLSIM), Harbin, 2010, pp. 1097-1100, doi: 10.1109/ICLSIM.2010.5461127. (Year: 2010).*
J.S. Chase, D.C. Anderson, P.N. Thakar, A.M. Vahdat, R.P. Doyle, Managing energy and server resources in hosting centers, in: Proceedings of the 18th ACM Symposium on Operating Systems Principles, ACM, New York, NY, USA, 2001, pp. 103-116 (Year: 2001).*
M. Mazzucco, D. Dyachuk and M. Dikaiakos, "Profit-Aware Server Allocation for Green Internet Services," 2010 IEEE International Symposium on Modeling, Analysis and Simulation of Computer and Telecommunication Systems, Miami Beach, FL, USA, 2010, pp. 277-284, doi: 10.1109/MASCOTS.2010.36. (Year: 2010).*
snia.org, https://composter.com.ua/documents/SNIASSSI PCIe101WhitePaper1.12013.pdf, "PCIe SSD 101", Jan. 1, 2013, pp. 1-32.
Mohammad Hedayati, et al., "Multi-Queue Fair Queuing", Department of Computer Science, University of Rochester Google Inc Technical Report #1005, Oct. 1, 2018, pp. 1-13, https://pdfs.semanticscholar.org/abd0/a302926f66268541a3cbb392b79fde7b4ecf.pdf.
Ann Klimovic, et al., "ReFlex: Remote Flash ≈ Local Flash", ASPLOS '17, Apr. 8-12, 2017, Xi'an, China Jul. 12, 2017, pp. 1-15, http://web.stanford.edu/group/mast/cgibin/drupal/system/files/reflex_asplos17.pdf.
Kim, John, et al., "How Ethernet RDMA Protocols iWARP and RoCE Support NVMe over Fabrics," SNIA, https://www.snia.org/forums/nsf/knowledge/webcasts, Jan. 26, 2016, 34 pages.

(56) References Cited

OTHER PUBLICATIONS

Office Action issued in U.S. Appl. No. 16/706,161 by the USPTO, dated Sep. 3, 2020, 9 pages.
U.S. Office Action dated Oct. 27, 2020, issued in U.S. Appl. No. 16/459,166 (10 pages).
U.S. Final Office Action dated Feb. 18, 2021, issued in U.S. Appl. No. 16/706,161 (10 pages).

* cited by examiner

| # | Terminology | Description |
|---|---|---|
| 1 | SSD | Solid State Drive |
| 2 | HDD | Hard Disk Drive |
| 3 | AHCI | Advance Host Controller Interface |
| 4 | SATA | Serial Advanced Technology Attachment protocol |
| 5 | SCSi | Serial Attached Small Computer System Interface |
| 6 | NVMe | Non-Volatile Memory Express |
| 7 | NVMeoF | NVMe over Fabrics |
| 8 | PCIe | Peripheral Component Interconnect Express |
| 9 | RDMA | Remote Direct Memory Access |
| 10 | RoCE | RDMA over Converged Ethernet |
| 11 | InfiniBand | A computer-networking communications standard used in high-performance computing that features very high throughput and very low latency |
| 12 | iWARP | Internet Wide-area RDMA Protocol |
| 13 | Namespace | A quantity of NVMe SSDs that can be formatted into logical blocks |
| 14 | NIC | Network Interface Controller |
| 15 | NUMA | Non-Uniform Memory Access |
| 16 | NQN | NVMe Qualified Name, list of Target (storage server) ID(s) |
| 17 | Capsule | Encapsulated NVMe Command/Completion within a transport message |
| 18 | Data | Transport data exchange mechanism (if any) |

Fig. 2-1T

| # | Symbols | Description |
|---|---|---|
| 1 | $T_{sys}$ | Average delay of each I/O request, i.e., the average time of each I/O that are in the system (including waiting in the Queue Pairs and being processed in the Target.) |
| 2 | $\mu$ | Service rate. |
| 3 | $\lambda$ | Arrival rate in NIC_CQ. |
| 4 | $\mu = f(N_q, \bar{h})$ | Service rate as a function of the "number of Queue Pairs in the Client stack" and the "average queued I/O height" |
| 5 | $N_q$ | The number of Queue Pairs in the Client stack. |
| 6 | $\bar{h}$ | The average queued I/O height. |
| 7 | $\bar{h} = g(W_L)$ | Queued I/O height as a function of lower watermark. Details can be seen in Section 4. |
| 8 | $\mu = f_{<N_q>}(g(W_L))$ | Service rate as a function of the "average queued I/O height", when the "number of Queue Pairs in the Client stack" is fixed. |
| 9 | $\mu = f_{<W_L>}(N_q)$ | Service rate as a function of the "number of Queue Pairs in the Client stack", when the "average queued I/O height" is fixed. |
| 10 | $W_L$ | Lower watermark in each Queue Pair in the Client stack. Details are shown in Section 5. |
| 11 | $W_H$ | Higher watermark in each Queue Pair in the Client stack. Details are shown in Section 5. |
| 12 | $W_{max}$ | Preset maximum queue size in each Queue Pair in the Client stack. Details are shown in Section 5. |
| 13 | $N_{max}$ | Maximum number of Queue Pair in the Client stack. Details are shown in Section 4. |

Fig. 2-2T

| # | Characteristics | Method 1 | Method 2 |
|---|---|---|---|
| 1 | Correlation | Service Rate vs Queue Pair Number | Service Rate vs Queued I/O Height |
| 2 | Component in charge | Component 1 | Component 2 |
| 3 | Change service rate efficiency | Fast | Slow |
| 4 | Overhead | Big | Small |

Fig. 3-1T

| # | Characteristics | Approach 1: Conservative | Approach 2: Aggressive |
|---|---|---|---|
| 1 | Feature | Conservatively adjust the $N_q$: increase/decrease one per time | Aggressively adjust the $N_q$: change to the "sweet spot" value directly |
| 2 | Advantage | Fast | Accurate |
| 3 | Disadvantage | Rough | Slow |

Fig. 3-2T

| # | Symbols | Pseudo Codes | Description |
|---|---|---|---|
| 1 | $\rho_H$ | rho_H | Preset overutilization threshold, e.g., 95%. |
| 2 | $\rho_L$ | rho_H | Preset underutilization threshold, e.g., 15%. |
| 3 | $\rho_T$ | rho_H | Preset target utilization threshold, e.g., 80%. |
| 4 | $\rho = \frac{\lambda}{\mu}$ | rho | Calculation of system utilization ratio: arrival rate divided by service rate. |
| 5 | $T_{utl}$ | T_utl | Preset threshold temporal window to determine whether overutilization/underutilization period is long enough to be trigger further actions. |
| 6 | $T_{reg}$ | T_reg | Preset threshold temporal window to conduct the Aggressive Approach (regression-based service rate optimization). |
| 7 | $N_q$ | N_q | The number of Queue Pairs in the Client stack. |
| 8 | $N_{max}$ | N_max | Maximum number of Queue Pair in the Client stack. |
| 9 | $N_{Target}$ | N_Target | Maximum number of Queue Pair in the Target stack, which is often advertised by the Target device vendor. |

Fig. 3-3T

| Case# | Scenarios | | Operations | | Approach | Description |
|---|---|---|---|---|---|---|
| | $\rho$ in range of | Conditions 1 and 2 are s.t.? | Component 1 | Component 2 | | |
| 1 | $[\rho_H, 100\%]$ | No | No | No | Conservative | System utilization ratio is too high at the moment, but it is not worth to increase the number of Queue Pairs. |
| 2 | $[\rho_H, 100\%]$ | Yes | $N_q + 1$ | No | Conservative | System utilization ratio is too high at the moment, and it is worth to increase the number of Queue Pairs. |
| 3 | $[0\%, \rho_L)$ | No | No | No | Conservative | System utilization ratio is too low at the moment, but it is not worth to decrease the number of Queue Pairs. |
| 4 | $[0\%, \rho_L)$ | Yes | $N_q - 1$ | No | Conservative | System utilization ratio is too low at the moment, and it is worth to decrease the number of Queue Pairs. |
| 5 | $[\rho_T, \rho_H)$ | No need to check conditions 1 and 2. | No | Tune $W_L$ | N/A | System utilization ratio is neither too high nor too low at the moment, but it is still higher than the target. So keep the number of Queue Pairs and optimize the performance to the target performance by tuning $W_L$ |
| 6 | $[\rho_T, \rho_T)$ | No need to check conditions 1 and 2. | No | No | Conservative | System utilization ratio is neither too high nor too low at the moment, but it is still higher than the target. So keep the number of Queue Pairs and do nothing. This is a relatively "safe zone", and we can leave the system run by itself without bothering adjusting Queue Pair number or watermarks. |
| 7 | $[\rho_H, 100\%]$ or $[0\%, \rho_L)$ | N/A | Regression-based adjustment | No | Aggressive | Periodically conduct regression-based optimization in terms of find the best service rate across all number of Queue Pairs data points. Details are described in Subsection 3.3. |

Fig. 3-4T

| # | Subcomponent | Function |
|---|---|---|
| 1 | Subcomponent 1: Service Rate and Queue Pair Number Monitor | Monitor and record the runtime Queue Pair number and corresponding service rate (IOPS) |
| 2 | Subcomponent 2: Service Rate and Queue Pair Number Regressor | Regress the correlation between Service Rate and Queue Pair number. There are two modes with different temporal granularities: "Mode 1: Rough Regression", and "Mode 2: Accurate Regression" |
| 3 | Subcomponent 3: Service Rate Predictor | Predict the corresponding Service rate by given a certain Queue Pair number. There are two modes with different temporal granularities: "Mode 1: Rough Prediction", and "Mode 2: Accurate Prediction" |

Fig. 3-5T

| # | Symbols | Description |
|---|---------|-------------|
| 1 | $W_L, W_H$ | Lower and higher watermarks in QP of Client stack |
| 2 | $h, \bar{h}$ | Queue height or average queue height, in the unit of I/O numbers |
| 3 | $Q_{max}, Q_{max}(Client), Q_{max}(Target)$ | System allowed max size of QP, and System allowed max size of QP in either the Client or Target stack |

Fig. 4-1T

| # | Symbols | Description |
|---|---|---|
| 1 | $\bar{h}(W_H \rightarrow W_L)$ | Average height of queued I/O requests during the time that this NIC_QP's height is $W_H$ to $W_L$. It may not necessarily be the middle point of $W_H$ and $W_L$. |
| 2 | $\tau_{h_j} = \dfrac{1}{\mu_{h_j}}$ | The time to finish one single I/O request when the height is $h_j$. |
| 3 | $\mu(h_j), \mu_{h_j}$ | We use both of these two notations to represent $\mu$ as a function of $h_j$. |
| 4 | $\sum\limits_{h_j=W_H}^{W_H}(h_j \cdot \tau_{h_j})$ | The sum of each height with the weight of each height's temporal length from $W_H$ to $W_L$. |
| 5 | $\sum\limits_{h_j=W_L}^{W_H}\tau_{h_j}$ | Total time spent (makespan) for the Queue Pair to complete $W_H$ + $W_L$ number of I/Os. |

Fig. 4-2T

|    |                                                                                                                        |
|----|------------------------------------------------------------------------------------------------------------------------|
|    | procedure watermarkScheme()                                                                                            |
| 1  | locked=FALSE                                                                                                           |
| 2  | while (IO in NIC_CQ):                                                                                                  |
| 3  | # If NIC_QP is unlocked and is not full, then enqueue the IO.                                                          |
| 4  | if (locked==FALSE and NIC_QP.height<W_H) do:                                                                           |
| 5  | NIC_QP.enqueue(IO)                                                                                                     |
| 6  | # If QP is locked, but there are (W_H-W_L) number of completed IOs, then unlock the queue and enqueue this IO.         |
| 7  | elif (locked==TRUE and NIC_QP.height<=W_L) do:                                                                         |
| 8  | locked=FALSE                                                                                                           |
| 9  | NIC_QP.enqueue(IO)                                                                                                     |
| 10 | # If the queue is full or locked, then wait for QP to reach WL to unlock.                                              |
| 11 | else:                                                                                                                  |
| 12 | wait()                                                                                                                 |
|    | procedure NIC_QP.enqueue(IO)                                                                                           |
| 13 | NIC_QP.push(IO)                                                                                                        |
| 14 | NIC_QP.height+=1                                                                                                       |
| 15 | # If NIC_QP is full after this IO is appended, then lock the NIC_QP                                                    |
| 16 | if NIC_QP.height==W_H do:                                                                                              |
| 17 | locked=TRUE                                                                                                            |
| 18 | return                                                                                                                 |

Fig. 4-5

SYSTEMS AND METHODS FOR I/O TRANSMISSIONS IN QUEUE PAIR-BASED NVMEOF INITIATOR-TARGET SYSTEM

CROSS-REFERENCE TO RELATED APPLICATION(S)

The present application claims priority to and the benefit of U.S. Provisional Application No. 62/859,562, filed Jun. 10, 2019, entitled "NVMEQPO: PERFORMANCE OPTIMIZER FOR I/O TRANSMISSIONS IN QUEUE PAIR-BASED NVMEOF INITIATOR-TARGET SYSTEM WITH WORKLOAD AND QUEUE PAIR-DEPENDENT SERVICE RATE", the entire content of which is incorporated herein by reference.

FIELD

One or more aspects of embodiments according to the present disclosure relate to data storage systems using non-volatile memory express over fabrics, and more particularly to a system and method for improving the performance of such data storage systems.

BACKGROUND

Existing non-volatile memory express over fabrics (NVMeoF) systems may, in some circumstances, exhibit poor performance. This may be caused by one or both of the following problems. First, some NVMeoF implementations may waste system resources by (i) maintaining extra idled queue pairs, or (ii) underutilizing the system due to not maintaining enough queue pairs. Second, some NVMeoF implementations may not have a suitable flow control scheme to prevent the queue pair service rate from being slowed down due to high I/O pressure (e.g., a large number of queued I/O jobs in the queue pair).

Thus, there is a need for a system and method for improving the performance of non-volatile memory express over fabrics data storage systems.

SUMMARY

According to an embodiment of the present invention, there is provided a method for managing input output queue pairs, the method including: calculating a system utilization ratio, the system utilization ratio being a ratio of: an arrival rate of input output requests, to a service rate; determining that: the system utilization ratio has exceeded a first threshold utilization during a time period exceeding a first threshold length, and adding a new queue pair is expected to improve system performance; and adding the new queue pair.

In some embodiments, the method further includes: determining that: the system utilization ratio has remained below a second threshold utilization during a time period exceeding the first threshold length, and deleting a queue pair is expected to improve system performance; and deleting the queue pair.

In some embodiments, the method further includes: determining that: the system utilization ratio is below the first threshold utilization and above a third threshold utilization; and adjusting a lower queue height threshold to be equal to a function of a service rate.

In some embodiments, the method further includes: determining that: a submission queue of a first queue pair of the input output queue pairs is unlocked, and a centralized queue stores an input output request, and a height of the submission queue is less than an upper queue height threshold; and enqueueing the input output request.

In some embodiments, the method further includes: determining that a current height of the submission queue equals the upper queue height threshold; and locking the submission queue.

In some embodiments, the method further includes: determining that the current height of the submission queue does not exceed the lower queue height threshold; and unlocking the submission queue.

In some embodiments, the function is a numerically found minimum of a model of an average processing delay per input output request.

In some embodiments, the model is a polynomial fit of historical average processing delays per input output request as a function of the service rate and the lower queue height threshold.

In some embodiments, the method further includes: determining that a time interval having a length exceeding a second threshold length has elapsed since a most recent use of numerical minimization to determine and set a number of queue pairs; performing numerical minimization of a model of an average processing delay per input output request as a function of the number of queue pairs, to calculate a number of queue pairs to be used during operation; and adding zero or more new queue pairs or deleting zero or more queue pairs so that the number of queue pairs is equal to the calculated number of queue pairs to be used during operation.

According to an embodiment of the present invention, there is provided a system, including: a processing circuit, and one or more persistent storage devices, the processing circuit being configured to: instantiate one or more input output queue pairs for storing: input output requests to be sent to the one or more persistent storage devices, and command completions received from the one or more persistent storage devices, calculate a system utilization ratio, the system utilization ratio being a ratio of: an arrival rate of input output requests, to a service rate; determine that: the system utilization ratio has exceeded a first threshold utilization during a time period exceeding a first threshold length, and adding a new queue pair is expected to improve system performance; and add a new queue pair.

In some embodiments, the processing circuit is further configured to: determine that: the system utilization ratio has remained below a second threshold utilization during a time period exceeding the first threshold length, and deleting a queue pair is expected to improve system performance; and delete a queue pair.

In some embodiments, the processing circuit is further configured to: determine that the system utilization ratio is below the first threshold utilization and above a third threshold utilization; and adjust a lower queue height threshold to be equal to a function of a service rate.

In some embodiments, the processing circuit is further configured to: determine that: a submission queue of a first queue pair of the input output queue pairs is unlocked, a centralized queue stores an input output request, and a height of the submission queue is less than an upper queue height threshold; and enqueue the input output request.

In some embodiments, the processing circuit is further configured to: determine that a current height of the submission queue equals the upper queue height threshold; and lock the submission queue.

In some embodiments, the processing circuit is further configured to: determine that the current height of the submission queue does not exceed the lower queue height threshold; and unlock the submission queue.

In some embodiments, the function is a numerically found minimum of a model of an average processing delay per input output request.

In some embodiments, the model is a polynomial fit of historical average processing delays per input output request as a function of the service rate and the lower queue height threshold.

In some embodiments, the processing circuit is further configured to: determine that a time interval having a length exceeding a second threshold length has elapsed since a most recent use of numerical minimization to determine and set a number of queue pairs; perform numerical minimization of a model of an average processing delay per input output request as a function of the number of queue pairs, to calculate a number of queue pairs to be used during operation; and add zero or more new queue pairs or deleting zero or more queue pairs so that the number of queue pairs is equal to the calculated number of queue pairs to be used during operation.

According to an embodiment of the present invention, there is provided a system, including: means for processing, and one or more persistent storage devices, the means for processing being configured to: instantiate one or more input output queue pairs for storing: input output requests to be sent to the one or more persistent storage devices, and command completions received from the one or more persistent storage devices, calculate a system utilization ratio, the system utilization ratio being a ratio of: an arrival rate of input output requests, to a service rate; determine that: the system utilization ratio has exceeded a first threshold utilization during a time period exceeding a first threshold length, and adding a new queue pair is expected to improve system performance; and add a new queue pair.

In some embodiments, the means for processing is further configured to: determine that: the system utilization ratio has remained below the first threshold utilization during a time period exceeding the first threshold length, and deleting a queue pair is expected to improve system performance; and delete a queue pair.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. These and other features and advantages of the present disclosure will be appreciated and understood with reference to the specification, claims, and appended drawings wherein:

FIG. 2-1T is a table of terminology, according to some embodiments of the present disclosure;

FIG. 2-1 is a diagram of an architecture of an NVMeoF protocol, according to some embodiments of the present disclosure;

FIG. 2-2 is a diagram of a queueing model of queue pairs in a network interface card (NIC) port, according to some embodiments of the present disclosure;

FIG. 2-2T is a table of symbols and descriptions used in bottleneck-based service rate analysis and modeling, according to some embodiments of the present disclosure;

FIG. 2-3 is an exemplary 3D surface diagram used in finding the maximal value of service rate as a function of a watermark variable and a number of queue pairs variable, according to some embodiments of the present disclosure;

FIG. 3-1 is a diagram of a model of queue pairs in both a client stack and target stacks, according to some embodiments of the present disclosure;

FIG. 3-1T is a table showing a comparison between two methods (method 1 and method 2) for adjusting the number of queue pairs and the queue pair depth, according to some embodiments of the present disclosure;

FIG. 3-2T is a table showing a comparison between two approaches (approaches 1 and 2) for adjusting the number of queue pairs in method 1, according to some embodiments of the present disclosure;

FIG. 3-2 is an exemplary diagram illustrating operational aspects relating to of switching optimization approaches based on different system utilization ratio cases, according to some embodiments of the present disclosure;

FIG. 3-3T is a table showing thresholds and target utilization ratio, and calculation of system utilization ratio which can be used for adjusting the number of queue pairs and the queue pair depth, according to some embodiments of the present disclosure;

FIG. 3-4T is a table of cases and corresponding operations which can be used for adjusting the number of queue pairs and the queue pair depth, according to some embodiments of the present disclosure;

FIG. 3-3 is a diagram of a workflow of two components which can be used for adjusting the number of queue pairs, according to some embodiments of the present disclosure;

FIG. 3-5T is a table of subcomponents in component 1 and their functions which can be used for adjusting the number of queue pairs, according to some embodiments of the present disclosure;

FIG. 3-4 is a diagram of a relationship between subcomponents in component 1 which can be used for adjusting the number of queue pairs, according to some embodiments of the present disclosure;

FIG. 3-5 is a diagram showing an example objective function used in regression-based aggressive approach, according to some embodiments of the present disclosure;

FIG. 4-1 is a diagram of an example of a queuing model which can be used for adjusting the queue pair depth, according to some embodiments of the present disclosure;

FIG. 4-1T is a table of terminology and corresponding descriptions relating to adjusting the queue pair depth, according to some embodiments of the present disclosure;

FIG. 4-2 is a diagram of an example of a relationship between queued input/output (I/O) height and service rate used in the context of adjusting the queue pair depth, according to some embodiments of the present disclosure;

FIG. 4-3 is a diagram of additional examples of a relationship between queued I/O height and service rate used in the context of adjusting the queue pair depth, according to some embodiments of the present disclosure;

FIG. 4-4 is a diagram of conditions and corresponding operations of watermark-based optimization for adjusting the queue pair depth, according to some embodiments of the present disclosure;

FIG. 4-5 is a diagram of some exemplary procedures associated with watermark-based optimization for adjusting the queue pair depth, according to some embodiments of the present disclosure;

FIG. 4-6 is a diagram of an exemplary workflow associated with watermark-based optimization for adjusting the queue pair depth, according to some embodiments of the present disclosure;

FIG. 4-2T is a table of terminology and corresponding descriptions relating to adjusting the queue pair depth, according to some embodiments of the present disclosure;

FIG. 4-7 is a diagram showing example average queued I/O request heights during different time periods associated with adjusting the queue pair depth, according to some embodiments of the present disclosure; and FIG. 4-8 is a diagram of an example of a three-dimensional graph that can be used by the disclosed system to select a lower watermark, according to some embodiments of the present disclosure.

DETAILED DESCRIPTION

The detailed description set forth below in connection with the appended drawings is intended as a description of exemplary embodiments of a system and method for improving the performance of non-volatile memory express over fabrics data storage systems provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

1. Introduction

This disclosure is generally directed to a performance optimizer called "NVMeQPO (NVMe Queue Pair Performance Optimizer)" to improve I/O transmission performance in queue pair-based NVMeoF initiator-target system by adaptively adjusting queue pair numbers and control I/O flows to obtain improved performance in terms of service rate with respect to conventional systems that do not adaptively adjust queue pair numbers and control I/O flows. Some embodiments are motivated by certain characteristics of the NVMeoF system such as the client stack's overall service rate being dependent on queue pair number, and on the average queued I/O height of each queue pair (which may be reflected by an arrival workload's distribution pattern).

NVMeoF can be used to improve the parallelism and scalability of computation and storage, and to decouple computation from storage. Some embodiments are driven by the problem in NVMeoF that the overall service rate of some queue pairs in each NIC (Network Interface Controller) port and their corresponding queue pairs in the target side may not be independent of the arrival of I/Os in the centralized queue in this NIC port (NIC_CQ). Accordingly, to improve the performance by minimizing the delay of each I/O request in the system, the disclosed systems may maximize the service rate by dynamically adjusting the parameters of arriving I/Os and queue pair settings during run time.

As mentioned above, some NVMeoF systems may have the following problems:

(1) Without any adaptive adjustments to the number of queue pairs in the NIC based on both workload pattern and system performance changes, some NVMeoF implementations may waste system resources. Such waste may result from (i) maintaining extra idled queue pairs, or (ii) underutilizing the system due to not maintaining enough queue pairs;

(2) Some NVMeoF implementations do not have a flow control scheme to prevent queue pair service rate from being slowed down when there is high I/O pressure (i.e., a large number of queued I/O jobs in the queue pair).

Figure 1:
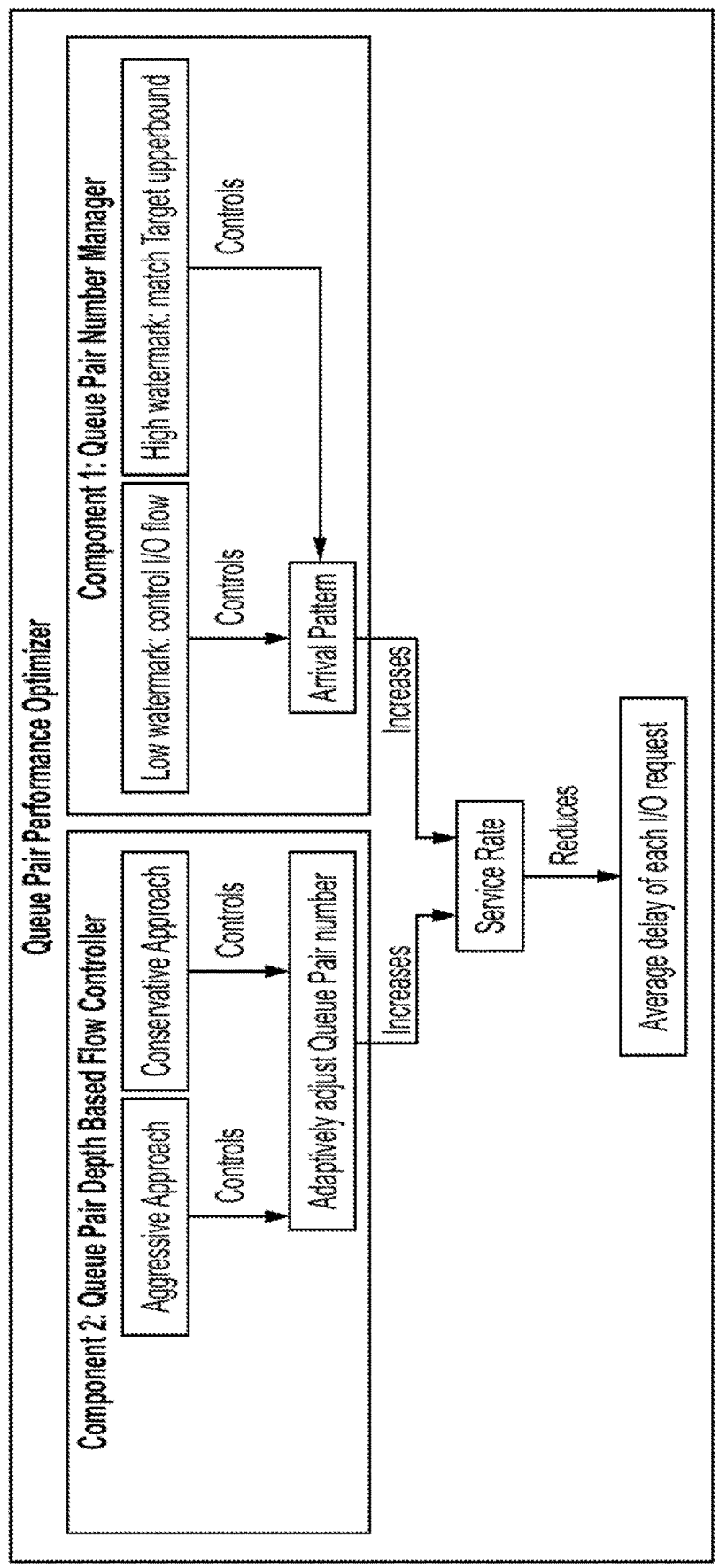
FIG. 1-1 is a diagram of a component architecture of a performance optimizer for NVMeoF systems based on a system employing non-uniform memory access (NUMA), according to some embodiments of the present disclosure.

To address the above-mentioned problems, some embodiments have two components—"component 1: queue pair number manager" and "component 2: queue pair depth based flow controller", as shown in FIG. 1-1. The disclosed systems can use component 1 to change the number of queue pairs to improve service rate. The disclosed systems can further implement component 2 for using two watermarks to control the arrival flow to adjust the distribution of the arrival I/O request stream. Further details are illustrated in the following sections.

2. System Overview of NVMeQPO

Figures 1, 2:
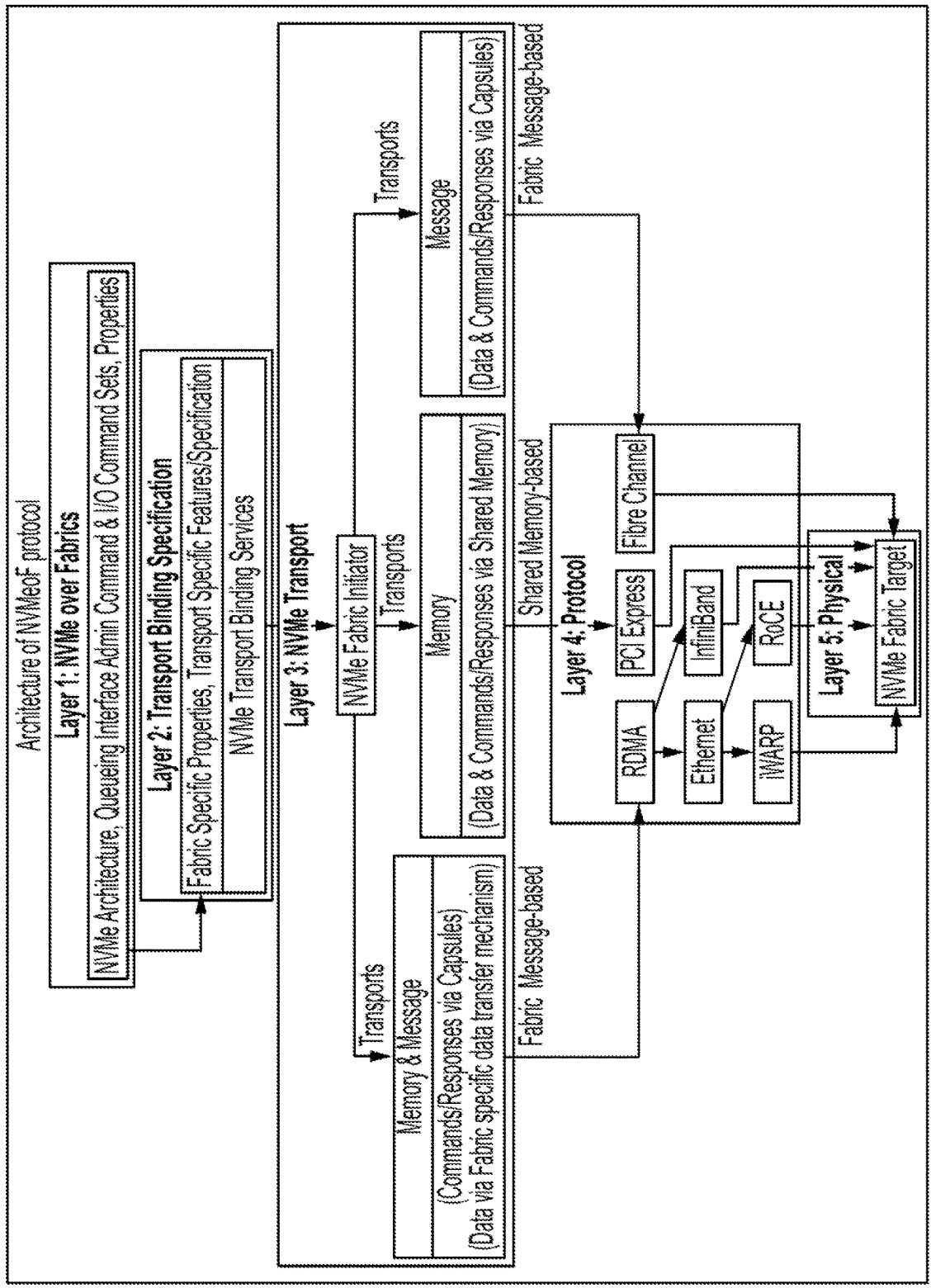
Figure 2:
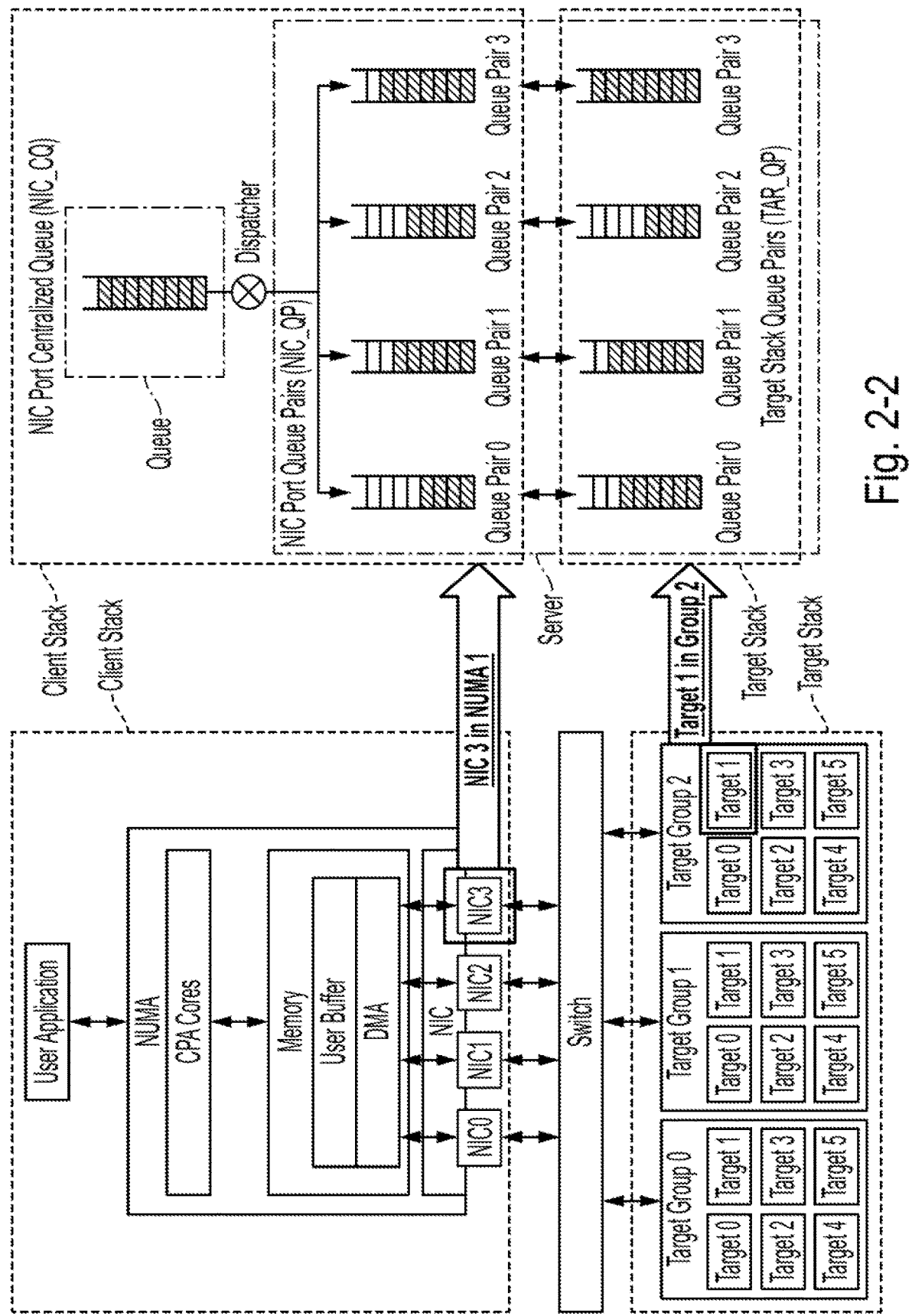

In this section, the background and limitations of the data path in some NVMeoF implementations are introduced, followed by a presentation of the problem formulation and an associated algorithm. The table of FIG. 2-1T summarizes the terminology used in this section.

2.1 Background of NVMeoF

Because of their fast access speed and small delay, SSDs are gradually replacing traditional HDDs in certain markets (e.g., datacenter market) as SSDs' capacities increase and SSDs' prices decrease. Traditionally, SSDs are connected to the server motherboard via SATA (Serial Advanced Technology Attachment) or SAS (Serial Attached Small Computer System) interface specification under the MCI (Advance Host Controller Interface) mechanism. However there may be two bottlenecks limiting the performance of the above-mentioned implementation:

(1) Bottleneck 1: Lack of Parallelism.

SSD's high I/O speed may be bottlenecked by the SATA interface. SATA was originally designed for traditional HDDs, and it can provide only up to 600 MB/sec bandwidth, which may be significantly lower than SSDs' bandwidth. An interface specification called NVMe (Non-Volatile Memory Express) describes parallelism and direct access to overcome the bottleneck.

NVMe describes the increased use of an SSD's bandwidth by using a PCIe (Peripheral Component Interconnect Express) bus channel and supporting up to 64k command queues and up to 64 commands per queue. In comparison, SATA can only support up to 32 command queues and only 1 command per queue.

NVMe improves the overall compute performance by processing a large number of I/O operations in parallel on the PCIe bus channel, which may be helpful for using multi-core processor resources.

Moreover, unlike SATA and SAS, NVMe devices can communicate with system CPU using relatively high-speed PCIe connections directly, which can serve to bypass intermediate stack layers and reduce I/O delay times.

(2) Bottleneck 2: Scalability issues due to relatively tight computation-storage coupling:

One SSD deployment method can include placing SSDs in a server where client instances (e.g., virtual machines, docker containers, or other applications) are running in the same server and use associated SSD resources. However, such an architecture may not scale because storage and computation resources may be coupled. For example, storage can be limited by the number of disk slots in the server, and both computation and storage may be overutilized or underutilized. This overutilization or underutilization can lead to low performance efficiency (e.g., poor resource management) and low financial efficiency (e.g., high total cost of ownership).

To overcome this limitation, a (NVMeoF) can serve to decouple storage and compute by directly connecting NVMe SSDs (housed in some dedicated storage-only hosts/servers) to the cluster rather than locking them to regular servers. This decoupling can serve to facilitate the connection of many (e.g., thousands or more) NVMe SSDs into a cluster, while leaving computation tasks on other servers. As a result, a variety of scalability-related features (such as replication and migration of data) can be achieved.

FIG. 2-1 shows an example of different layers in NVMeoF system, such as different transport modes that are supported by NVMeoF. NVMeoF is based on the NVMe 1.2 protocol, and includes changes to the NVMe transport layer. NVMeoF supports three transport modes: "Memory", "Message", and "Memory & Message". One difference between NVMe (through PCIe) and NVMeoF can be that NVMeoF can be run on Fabrics, a message-based transport, while NVMe PCIe may use shared memory.

This is depicted in FIG. 2-1, where NVMeoF also depends on and uses remote direct memory access (RDMA) including InfiniBand (having a bandwidth of around 40 Gbps), RDMA over Converged Ethernet (RoCE) and Internet Wide Area RDMA Protocol (iWARP) (RoCE and iWARP are through Ethernet with bandwidths of about 25 Gbps or even 100 Gbps). NVMeoF, compared to Internet Small Computer System Interface (iSCSI), may have a lower latency. This can add some delay (e.g., a few microseconds) for traffic to cross the network. NVMeoF may enable faster access between hosts and storage systems.

While NVMe and NVMeoF may be used to overcome the above-mentioned limitations, the service rate used in NVMeoF may not be independent of various factors, such as arrival I/O request streams, and queue pair number in a client stack.

In the following subsections, implementation details are provided.

2.2 Problem Formulation

FIG. 2-2 shows an example of an I/O path in an example NVMeoF environment. As mentioned, NVMeoF can be used to separate compute and storage. Thus, FIG. 2-2 shows two stacks: a client stack (data processing server) and a target stack (storage pool). I/O requests can be generated by the "user application" (on the left-hand side of FIG. 2-2) in the client stack. An operating system dispatcher (distinct from the dispatcher, shown on the right-hand side of FIG. 2-2, that distributes I/Os to the queue pairs) can select the NUMA (e.g., the processing circuit, from among several, employing Non-Uniform Memory Access) for each I/O request based on the NUMA's preferred target list. Once a path is selected (for example, NIC 3 of NUMA 1 is selected to communicate with target 1 in target group 2), this I/O request and its corresponding computation tasks can be assigned to this NUMA (e.g., CPU and memory resources may be used).

The I/O access operation can be forwarded to the target stack via network switch. The memory inside each NUMA can be further partitioned into two parts: "user buffer" and "DMA (Direct Memory Access)". The user buffer is the memory region in which to store the returned I/O results from the target stack. The DMA can be dedicated for transmitting I/Os to and from the NVMeoF targets. This DMA may be used in part because the associated RDMA transport protocol may require the pinning of memory regions for the purpose of obtaining contiguous physical memory for performing direct memory access.

Some embodiments serve to improve performance by tuning parameters in the client stack.

The I/O path can be further described by a server-queue model as shown in the right-hand side of FIG. 2-2. Each NIC port can have its own centralized queue (i.e., NIC_CQ), and the I/Os that are assigned to a given NIC port may first be queued in the NIC_CQ. The dispatcher may then distribute the queued I/Os one by one to corresponding queue pairs (NIC_QP). Each queue pair may be connected to the corresponding queue pair in the target stack (TAR_QP). The dispatcher can balance loads among queue pairs in the client stack.

The NIC_QP and TAR_QP are modeled as a single server (e.g., a black box). It may be observed that:

(1) The number of NIC_QP can affect the service rate, and the relationship between them may not be linear;

(2) The queued I/O request numbers in the NIC_QP may also affect the service rate, and the relationship between them may not be linear;

(3) The system may ensure that the number of queued I/O in NIC_CQ is finite, i.e., the arrival rate is less than or equal to the service rate of the server.

To minimize the delay of each I/O request, the following optimization framework can be used:

$$\text{Min:} \quad T_{sys} = \frac{1}{\mu - \lambda} \qquad \text{Eq. 2-1}$$

$$\text{S.t.:}$$

$$\frac{\lambda}{\mu} \in [0, 1)$$

$$\mu = f(N_q, \bar{h})$$

$$\bar{h} = g(W_L)$$

The objective function in Eq. 2-1 can represent the average delay of I/O requests according to an M/M/1 queuing model, which represents a model that generally describes behaviors of queues. The second equation represents a constraint that ensures the system is stable. The third equation reflects that the service rate can be expressed (or "regressed", i.e., modeled using a regression technique) as a function of two input parameters—number of queue pairs in the client stack, and the average queued I/O request height. The last line of equation 2-1 shows that the disclosed systems can use a lower watermark (discussed in further detail below) to control the average queued I/O request height.

Details and proofs for methods for adjusting the queue pair depth are described in Section 4.

In other words, the disclosed systems may employ a mechanism to ensure the arrival rate is less than or equal to the service rate.

Once $\lambda \leq \mu$, the objective then becomes how to maximize the service rate $\mu$, as:

$$\text{Max:} \qquad \text{Eq. 2-2}$$

$$\mu = f(N_q, \bar{h})$$

$$\text{S.t.:}$$

-continued $$W_L \in [1, W_H)$$

$$W_H \in (W_L, W_{max})$$

$$\frac{\lambda}{\mu} \in [0, 1)$$

$$N_q \in [1, N_{max}]$$

Figures 2, 3:
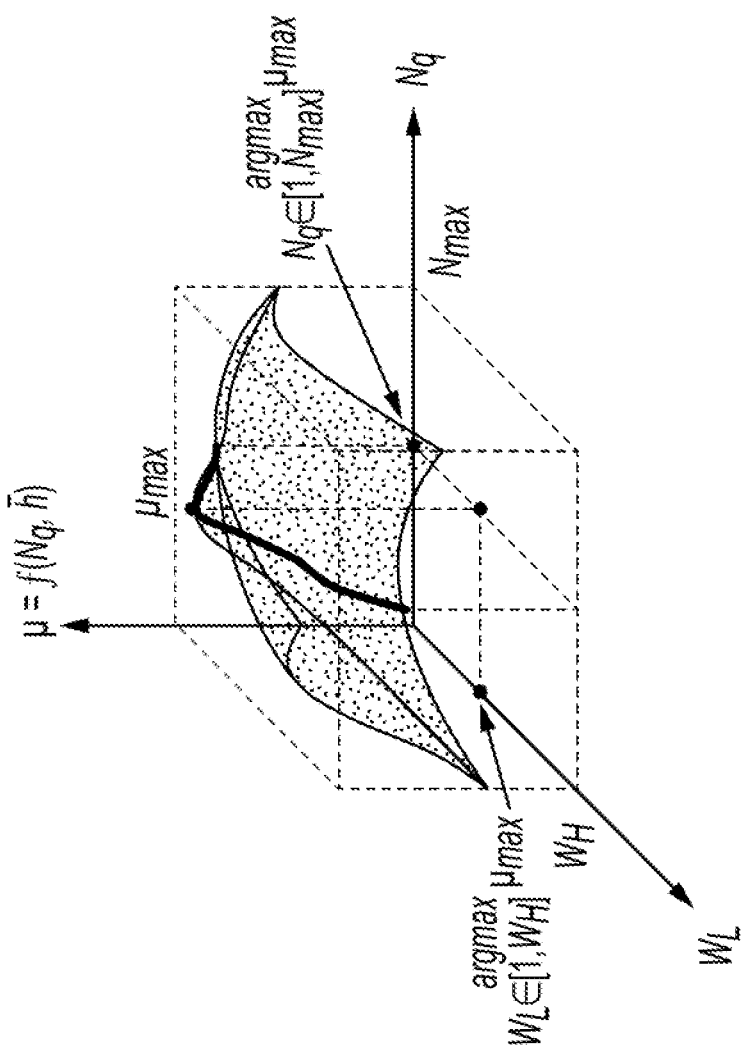

FIG. 2-3 shows an example diagram illustrating such a domain—maximizing by tuning both a low watermark $W_L$ and number of queue pairs $N_q$. The disclosed systems may be unable to directly control average queued I/O height ($\bar{h}$), but the disclosed systems can indirectly control it by tuning a low watermark $W_L$. Section 4 below includes more details about this.

It may be computationally intensive to find the maximal point in the 3D-surface represented in FIG. 2-3 during runtime, for example, because there may be no strict guarantee that the surface is concave. Moreover, the operations associated with changing the number of queue pairs and adjusting the low watermark can have a different associated overhead. Generally speaking, adjusting the number of queue pairs may be more computationally costly since a queue pair can include a thread which consumes CPU and memory resources. Thus, the disclosed systems can, in one aspect, fix one variable and tune the other variable one under different scenarios based on which variable affects the service rate more. In other words, the disclosed systems may employ two methods:

Method 1: if the disclosed systems fix the watermark, then the disclosed systems can tune $N_q$ to optimize (maximize) the service rate $\mu$.

$$\forall N_q \in [1, N_{max}], \mu = f_{<W_L>}(N_q) \quad 2\text{-}3$$

Method 2: if the disclosed systems fix the number of queue pairs, then the disclosed systems can tune $W_L$ to optimize (maximize) the service rate $\mu$.

$$\forall W_L \in [1, W_H), \mu = f_{<N_q>}(g(W_L)) \quad 2\text{-}4$$

Method 1 can be performed by component 1, and method 2 can be performed by component 2. The following sections discuss when to use which approach.

3. Component 1: Queue Pair Number Manager

This section first discusses the boundaries of the number of queue pairs in the client stack. Then this section describes two different approaches to adjust the number of queue pairs based on different purposes and under different associated scenarios. This section also illustrates NVMeQPO's solution to switch between approach 1 and approach 2 as mentioned above.

3.1 Discussion on Boundaries of Number of Queue Pairs

FIG. 3-1 shows an example of a centralized queue and a plurality of queue pairs, the full portion of each of which is shown with cross hatching. There may be multiple queue pairs in both client and target stacks. For each queue pair in each stack, the disclosed systems may create separate threads for each of the queue pairs, and configure software first in, first out (FIFO) queues to be operated on by each queue pair.

Some embodiments describe adjusting the number of queue pairs in the client stack, because the configuration of target stack may not be readily adjusted by the host system. Further detailed knowledge of the target stack may not be available in various implementations of cloud computing infrastructures.

Several points may need to be considered as relates to different queue pair configurations:

(1) The number of queue pairs in these two stacks may be same or different.

(2) Each queue pair in the client stack is connected to one queue pair in the target stack.

(3) Having different number of queue pairs (QPs) may have different overall service rate $\mu$, and the relationship may not necessarily be linear.

(4) The target in NVMe advertises the maximum number of queue pairs that can be connected ($N_{Target}$).

(5) There may be a limit to the number of QPs. Further, the disclosed systems may match the upper bound of queue pairs in the client stack to the queue pair number in the target stack.

(6) A single queue pair may be sufficient to achieve a given line rate if the target has a single SSD to write to, and the queue depth per queue pair may also be advertised by the target ($W_{max}$).

Thus, the following may be obtained:

$$1 \le N_q \le N_{max} = N_{Target} \quad 3\text{-}1$$

Why Not Use the Max Number of Queue Pairs?

Empirically, the disclosed systems can send maximum workload and determine the maximum number of queue pairs that can be used to help to improve the service rate. For example, the host system can be configured to use the maximum number of queue pairs in client stack to be the same as target stack advertised by the target vendor.

However, using the maximum number of queue pairs advertised by the target may not be optimal. For example, maintaining additional number of queue pairs may also serve as an overhead at the client side, and using a large number of queue pairs for smaller workloads might also inversely affect the performance (e.g., idling queue pairs may be wasting resources).

In other words, having more queue pairs in the client stack may improve the performance by permitting the increased use of the network bandwidth and CPU resource in both client and target stacks. However, having queue pairs may carry a cost. The reason for the cost may be that establishing a queue pair may create a thread which consumes CPU and memory resources in the hosting NUMA (in the client stack). In practice, NUMA CPU and memory resources may be limited and expensive, and it may be undesirable to have a number idle queue pairs beyond a predetermined threshold.

This disclosure first presents a "conservative approach" in Subsection 3.2 which adaptively increases and decreases the number of queue pairs iteratively (one per unit of time) based on system utilization. This disclosure further presents a second approach called "aggressive approach" in Subsection 3.3 to periodically conduct more accurate performance optimization by directly changing the number of queue pairs to a predetermined operational point using runtime monitoring and regression.

3.2 Conservative Approach

The system utilization ratio can be used to determine when to switch methods by indicating how "fully" the system is utilized. The table of FIG. 3-1T summarizes some difference between these two methods. The table of FIG. 3-2T further summarizes the two approaches developed for method 1. This disclosure introduces a "conservative approach" in this subsection, and describes an "aggressive approach" in Subsection 3.3.

Method 1 can change the service rate immediately and significantly but it may trigger significant overhead, while method 2 can slowly converge to the predetermined operational point of the service rate with low overhead.

As such, in some embodiments, the system may remove (disable) a queue pair to save resources and improve the service rates of remaining queue pairs, for example, if the system utilization ratio is lower than an underutilization threshold.

Similarly, if the system utilization ratio is higher than an overutilization threshold, the system may create (enable) a new queue pair to avoid generating an unstable system.

These two cases may represent relatively extreme operational circumstances that may not necessarily be improved in a relatively short period of time by changing watermarks.

Meanwhile, within the range of non-underutilized and non-overutilized periods, the disclosed systems can use watermark to improve the service rate.

FIG. 3-2 illustrates an example of how two approaches are switched during runtime based on the system utilization ratio. The table of FIG. 3-3T also describes the symbols used in this figure. In some examples, it may be advantageous to limit the frequency of changing the number of queue pairs since doing so may be computationally costly. To accomplish this limiting, the disclosed systems introduce two additional conditions to determine whether to change the number of queue pairs if two thresholds are reached.

Condition 1: Determine whether the overutilization or the underutilization period is long enough (by comparing it with a preset threshold temporal window (or "first threshold length") $T_{util}$.

Condition 2: Determine whether increasing or decreasing a queue pair can improve the service rate (discussed in Subsection 3.3 and the table of FIG. 3-5T).

Figures 1, 3:
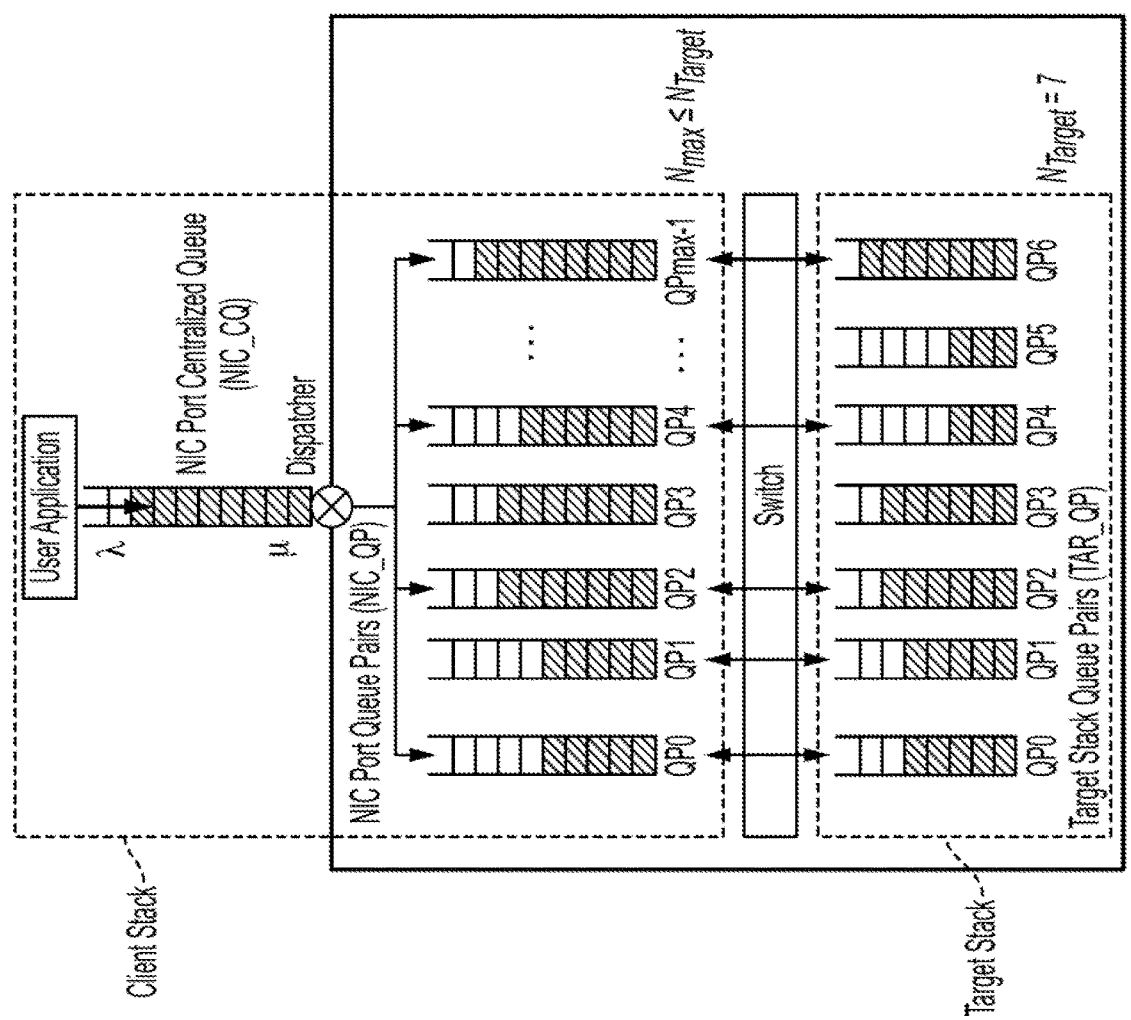
Figures 2, 3:
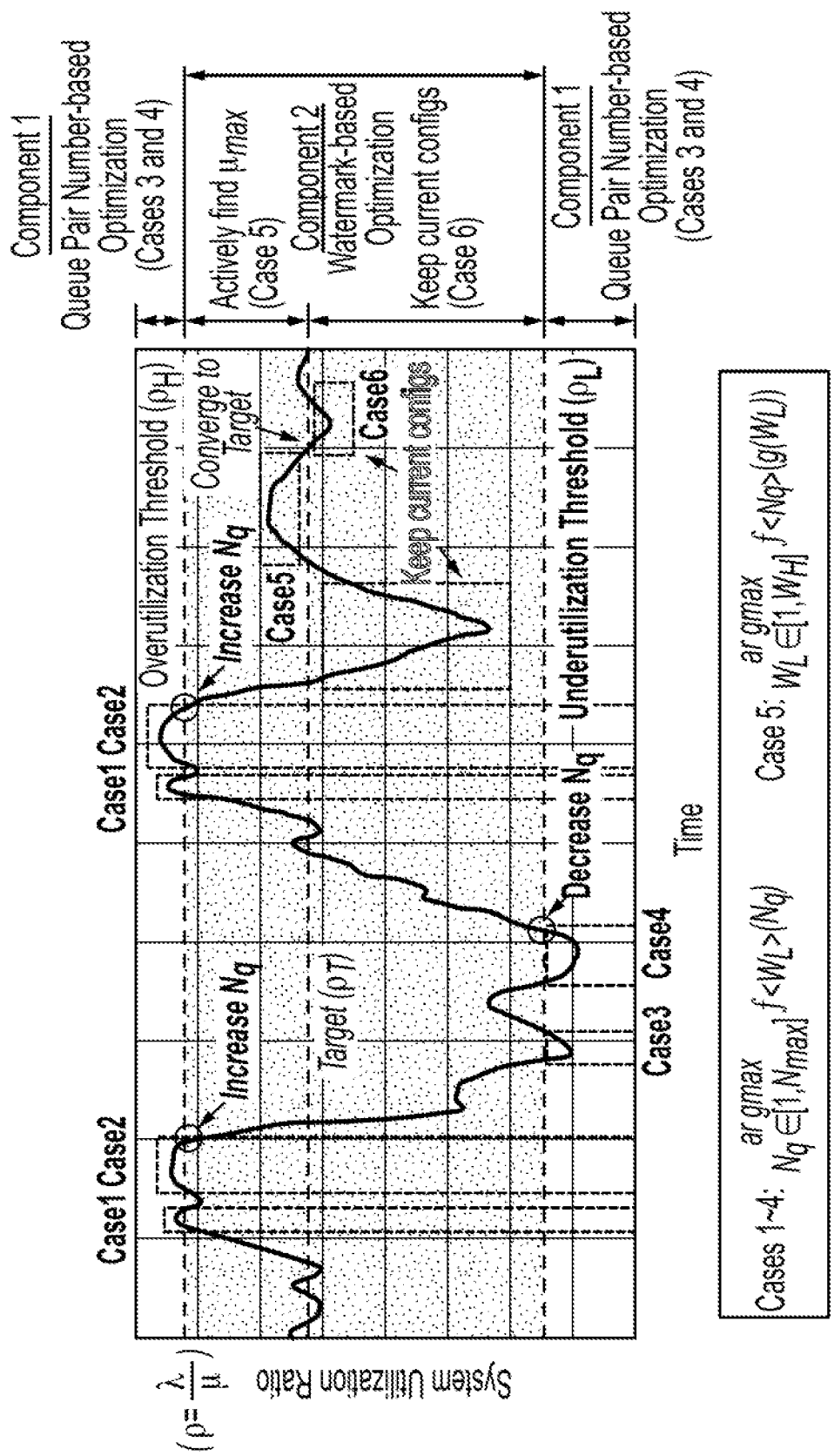
Figure 3:
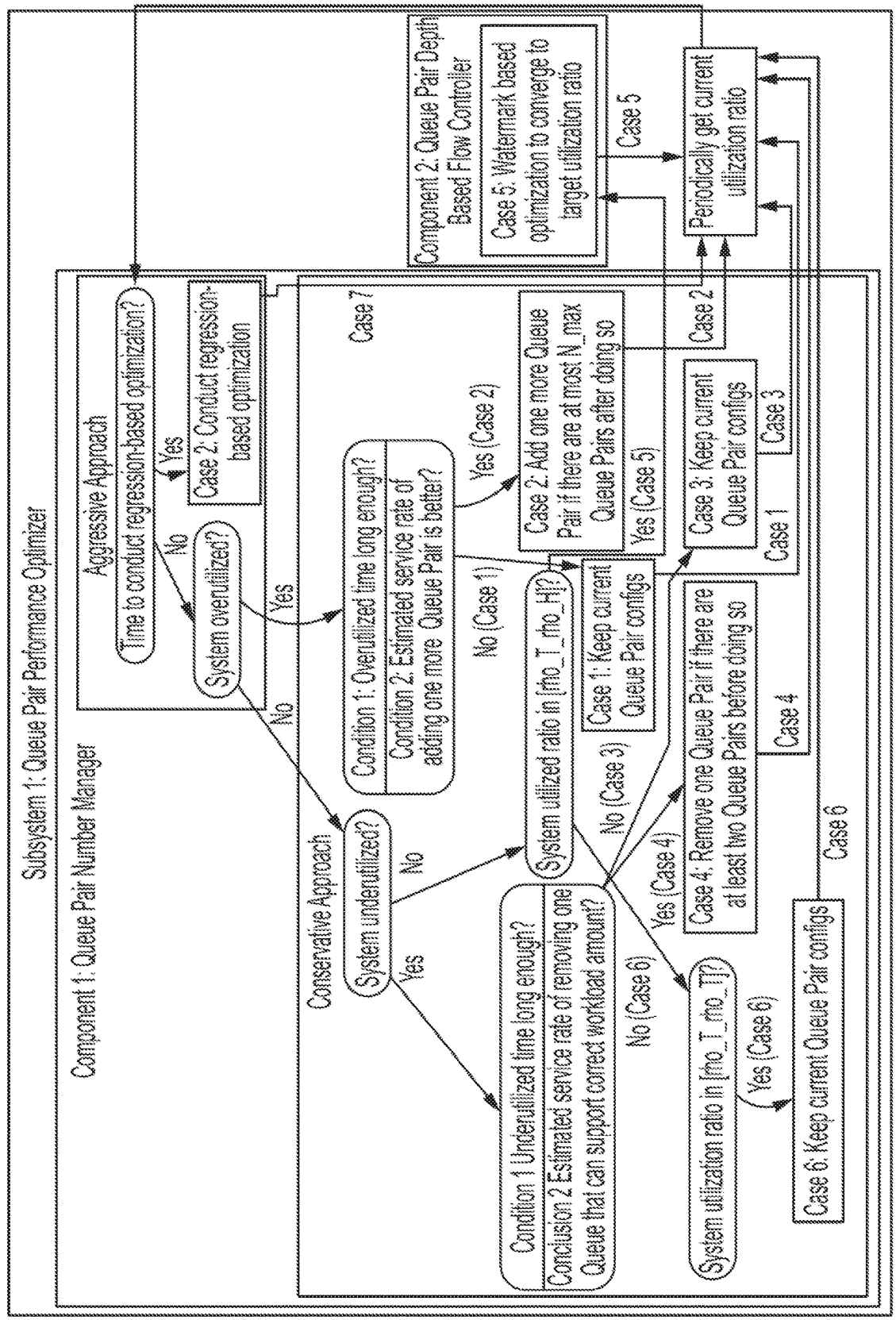
Figures 3, 4:
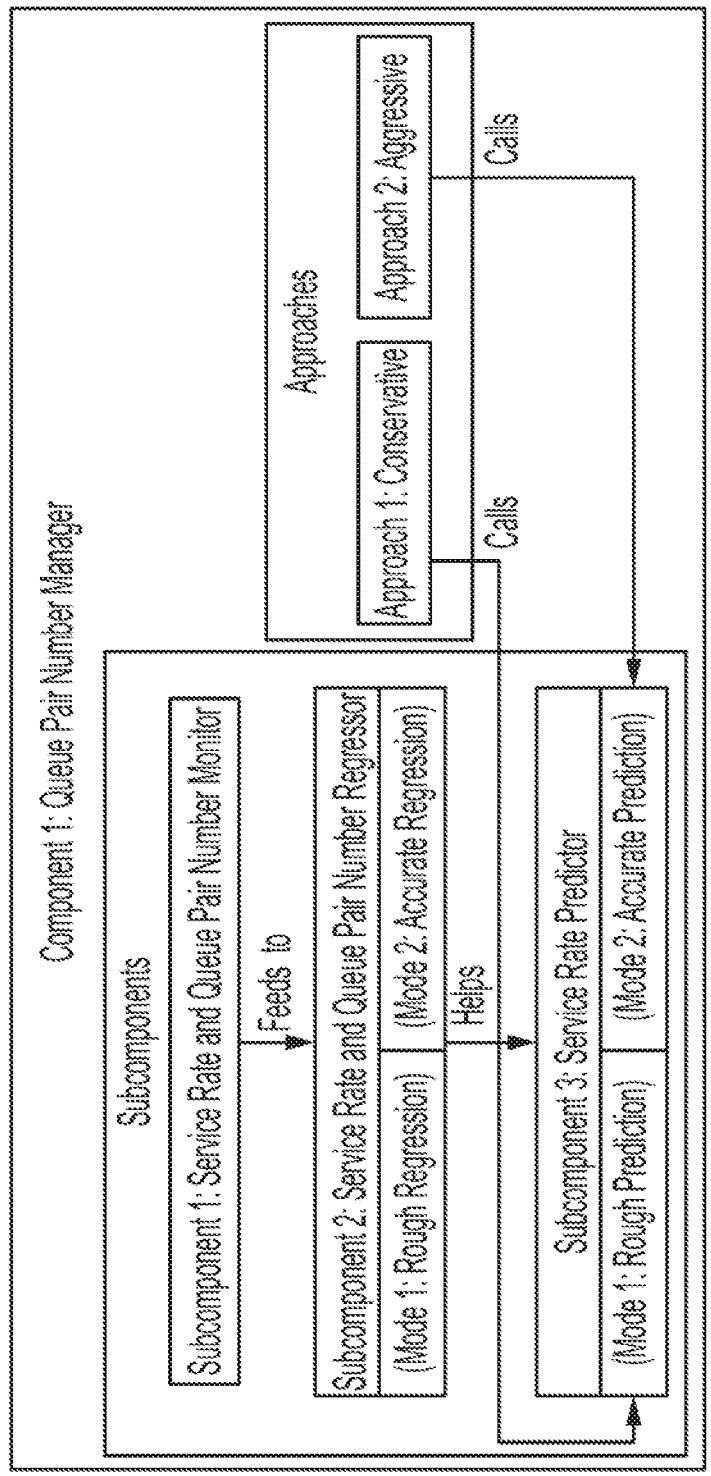

Based on these conditions, the following operations may be employed for 7 different scenarios as shown in the table of FIG. 3-4T. In detail, cases 1 and 2 are for situations in which the system utilization ratio is larger than the "overutilization threshold" (or "first threshold utilization"), and the disclosed systems may immediately improve the service rate. Case 1 represents the situation in which the two conditions are not fully satisfied, and the disclosed systems consider it as a temporal burst or a case that changing $N_a$ could not help, and the disclosed systems do not do anything. Case 2 represents the situation in which the two conditions are fully satisfied, then the disclosed systems may trigger component 1 to conduct approach 1 to improve the service rate immediately.

A similar design may be used for cases 3 and 4 when the system utilization ratio is lower than the "underutilization threshold" (or "second threshold utilization"). When the system utilization ratio is neither overutilized nor underutilized (i.e., the "safe zone"), the disclosed system can serve to maximize the service rate by tuning the watermarks (additional details are described in Section 4, below).

The disclosed systems can further conduct a regression-based optimization (e.g., a numerical minimization) (also achieved by component 1) with a large window (or "second threshold length", $T_{reg}$) to further improve the performance by finding the best service rate across all number of queue pairs data points. This is called "aggressive approach" and is listed as case 7 in the table of FIG. 3-3T, where the disclosed systems can directly adjust the number of queue pairs to the predetermined operational point instead of slowly adjusting its value one by one, without considering conditions 1 and 2. Details are described in Subsection 3.3. This numerical minimization may be performed when a time interval having a length exceeding the second threshold length has elapsed since a most recent use of numerical minimization to determine and set the number of queue pairs.

In order to further reduce overhead of frequently changing settings, the disclosed systems can be configured to, instead of maximizing the service rate, to converge to the target system utilization ratio.

In detail, the disclosed systems can increase the service rate $\mu$, but once the target (or "third threshold utilization") $\rho_T$ is reached (notice that according to the definition of $$\rho = \frac{\lambda}{\mu},$$

increasing service rate may decrease the p, under the same arrival rate $\lambda$), the disclosed systems need not make further adjustments to further approach the maximal service rate, since frequent adjustment may be computationally costly.

Accordingly, the disclosed systems can configure the system utilization rate as an indicator (together with other conditions as shown in FIG. 3-5T) to differentiate between circumstances to be handled differently, and the disclosed systems use different approaches and corresponding operations to improve the performance. As such, some embodiments are capable of adapting to changing circumstances in operation, and of taking into account the system overhead costs incurred by certain parameter changes.

In detail, case 5 represents a situation in which the utilization ratio is higher than the target but lower than the underutilization threshold. In this area, the system may converge to the target by using component 2. Once the target is reached, and the utilization ratio is in the range of $[\rho_T, \rho_H)$, the disclosed systems may not need to call components 1 and 2, as shown in case 6.

FIG. 3-3 further shows the major procedure of these approach-switching operations.

3.3 Aggressive Approach

Although conservative adjustment of number of queue pairs can handle the performance improvement task in a relatively gradual fashion, the disclosed systems also may aggressively adjust the number of queue pairs to a relatively computationally efficient number for cases in which the conservative approach is too slow.

The table of FIG. 3-5T shows three subcomponents used in component 1 that can be used in both the conservative approach (for checking condition 2, i.e., the estimated performance change after increasing/decreasing one queue pair), and the aggressive approach (to find the predetermined operational point for maximal service rate).

One difference between these two approaches to use these subcomponents is that the conservative approach can call the "Mode 1: Rough Prediction" in subcomponent 2 which may communicate with to "Mode 1: Rough Regression" in subcomponent 3, while the aggressive approach may call "Mode 2: Accurate Prediction" in subcomponent 2 which may communicate with "Mode 2: Accurate Regression" in subcomponent 3.

Therefore, the aggressive approach may be more computationally costly as compared with the conservative approach, and for this reason, the disclosed systems may not frequently call (i.e., $T_{reg}$ in the table of FIG. 3-3T should be a relatively long time interval, e.g., between 1.0 seconds and 100.0 seconds (e.g., 10 seconds)).

FIG. 3-4 also illustrates the relationship between subcomponents in component 1.

Once the disclosed systems have the performance prediction function, the disclosed systems can conduct the following optimization framework: With $\bar{h}$ and $W_L$ fixed, the disclosed systems can try to minimize $T_{sys}$ by maximizing the service rate $\mu = f\langle_{W_L}\rangle(N_q)$, as shown in Eq. 3-2:

$$\text{Min:} \quad T_{Sys} = \frac{1}{\mu - \lambda} \quad \text{Eq. 3-2}$$

$$\text{S.t.:}$$

$$\mu = f_{(W_L)}(N_q)$$

$$1 \leq N_q \leq N_{max}$$

$$N_{max} = N_{Target}$$

$$\frac{\lambda}{\mu} \in [0, 1)$$

where: the first equation shows that an objective of the framework is to find the queue pair number that can achieve a relatively low delay (e.g., the delay is calculated based on M/M/1 queuing theory); the second equation shows that given $W_L$, the disclosed systems may be iterating the number of queue pairs; the third equation is the boundary of $N_q$; the fourth equation shows that the upper bound should be aligned with the advertised max queue pair number in the target stack; and the last equation ensures that the system stable.

Figures 3, 4, 5:
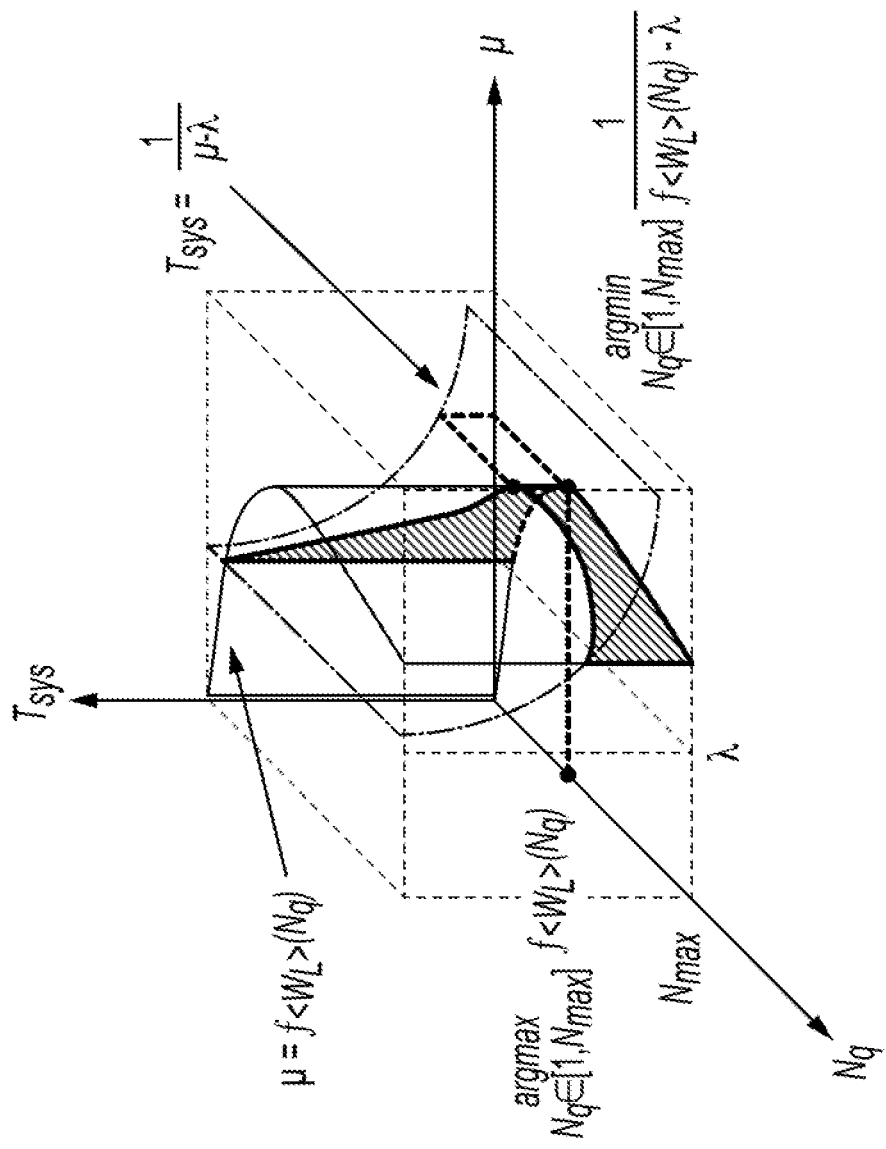

The disclosed systems can then search for the minimum $T_{sys}$ point in the line forming the upper boundary of the shaded, curved surface in FIG. 3-5. The curve of function $\mu$ and number of queue pairs may not be a linear curve, i.e., it may have one predetermined operational point. The disclosed systems may periodically monitor and regress the curve, and use an algorithm (e.g., greedy algorithm, gradient descent method, A* search algorithm or other machine learning method, and/or the like) to find the predetermined operational point.

4. Component 2: Queue Pair Depth Based Flow Controller

Besides queue pair number, queue pair depth may also affect the performance of the system. In other words, the service rate may be dependent on the average queued I/O request height (i.e., queue depth) in queue pairs of client stack. Queue depth controls the I/O flow and delay (or gap) between I/O requests, and having a suitable delay (or gap) may allow the target stack resource to have a chance to better schedule background processes to be run in parallel.

However, it may be computationally difficult to directly control the queue depth. As a result, NVMeQPO's component 2 may improve the service rate by tuning two watermarks related to the queue depth (e.g., by controlling the arrival pattern, not the arrival rate).

4.1 Workload-Dependent Service Rate Queuing Model

As shown in FIG. 4-1 and described further below, a model can be used to describe the storage controller queue pairs. The table of FIG. 4-1T summarizes some terminology used in this section.

The I/O requests (SCSi commands) from the host's initiator HBA (host bus adapter) to the storage controller's target adapter may first be queued in the NIC Port centralized queue (NIC_CQ). The I/O requests have the arrival rate $\lambda$ units of I/O per second (10 PS). The NIC_CQ then sends its I/Os to a dispatcher which strives to evenly distribute these I/Os to the $N_q$ queue pairs (NIC_QP) associated to it ($N_q$ being the number of queue pairs in the NIC). These queue pairs associated to the same NIC_CQ may have the same configurations. Moreover, over a relatively long time interval, the queue pairs may get $\lambda/N_q$ arrival rate, and the queue pair has $\mu$ service rate which is in units of IOPS.

NIC_QPs are not infinite queues, and the NIC_QPs associated to one CQ may have the same and fixed max depth $Q_{max}$ (Client), which is the maximum number of I/Os that can be queued and processed by the target in that QP.

In some embodiments, the service rate is not fixed and is related with the number of queued I/Os: When the NIC_QP is full, any new I/Os allocated to this NIC_QP (i.e., these outstanding I/Os are hitting the ports ceiling) may be rejected by a "QFULL" (i.e., queue full) error message sent from a storage port. Once the QFULL message is sent to the initiator, the HBA may pause the I/Os after a little while, and then slowly try to start running to the storage ports again. The sending of an I/O to a full QP may trigger a "QFULL" error, and may reduce the performance.

Besides QFULL error, the service rate may be related with the height of the queued I/Os. As shown in FIG. 4-2, the service rate for the three lightly cross-hatched I/O requests are different when there is "no push" and with "push"—small height may have large service rate. This is because the latter may have higher chance to get "QFULL" errors from both client stack's and target stack's queue pairs, and "QFULL" errors and their corresponding retries may significantly slow down the service rate.

However, there may not be a linear relationship between queued height and service rate, i.e., "the lower height the better the service rate is". For example, for a very low queue height in the NIC_QP, then the TAR_QP resource may not be fully utilized, and thus the service rate may not be maximized. Thus, there may be a tradeoff between "queue pair overflow: too much QFULLs" or "queue pair underutilized: less QFULLs but idling resource". There may be a predetermined operational point (i.e., a suitable pressure value where the disclosed systems can achieve the best service rate) of the average queued I/O requests. An example of this is shown in FIG. 4-3, where h=5 has the best service rate 10.

Such a predetermined operational point may exist for the following two reasons:

(1) the predetermined operational point balances the above-mentioned tradeoff by: (i) lowering the height to reducing "QFULL"s, and (ii) striving to fully utilize the resource by not having too low queue height;

(2) the predetermined operational point also allows some idle time to ensure target stack to schedule background operations to be performed in parallel (e.g., system interrupt like "memory copy"), and align and sync the heartbeat of the I/O stack.

Thus, the disclosed systems may try to align the average queue height to this predetermined operational point to get the best service rate.

4.2 Controlling Service Rate by Two Watermarks

The disclosed systems cannot directly control the average queue height to improve the performance, but the disclosed systems can indirectly control it by using two watermarks: a high watermark (or "upper queue height threshold") $W_H$ and a low watermark $W_L$ (or "lower queue height threshold"). Specifically, $W_H$ may be used to match the upper bound to prevent QFULL, and $W_L$ may be used to control height and find the best service rate.

Figures 1, 4:
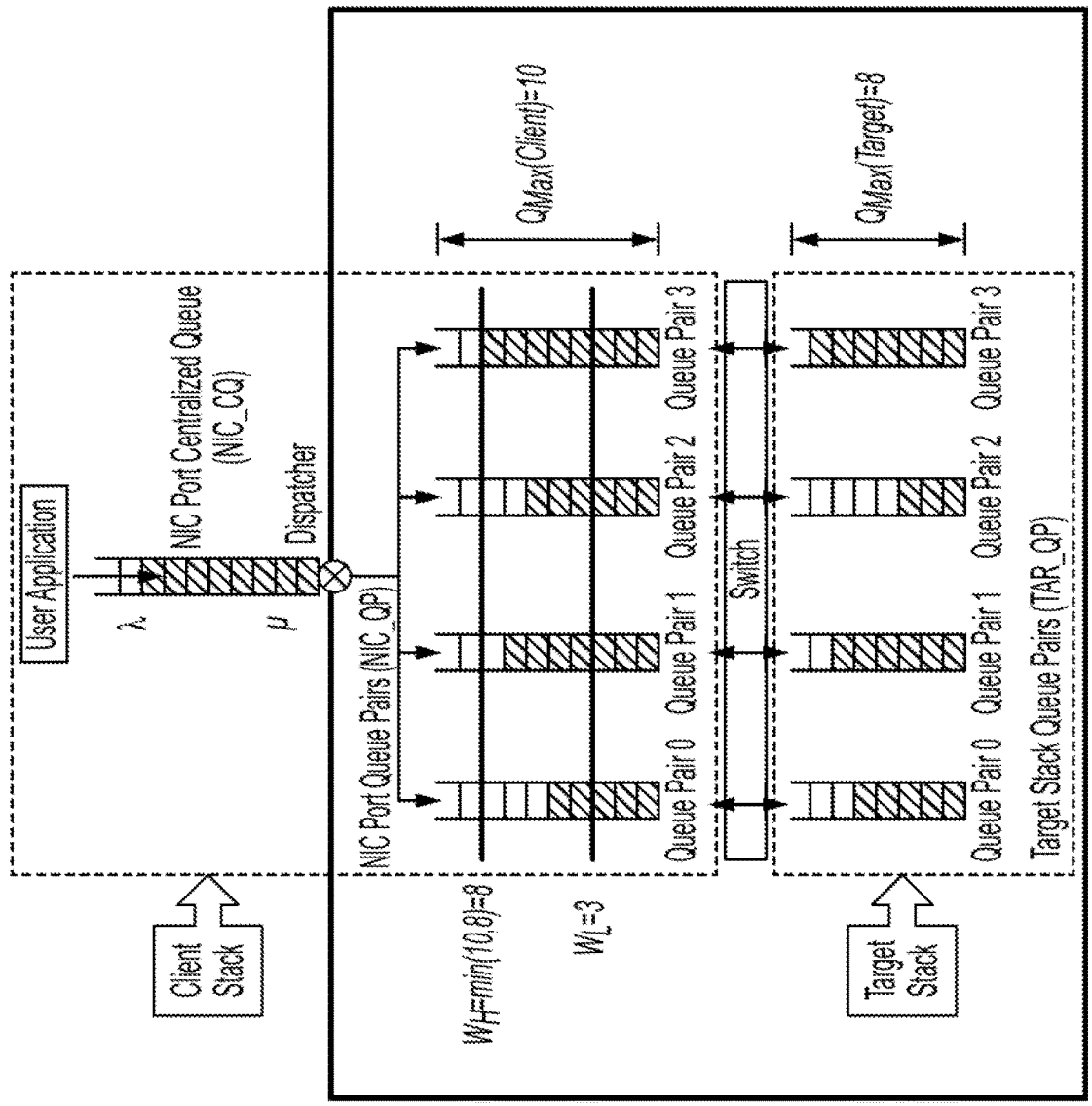
Figures 2, 4:
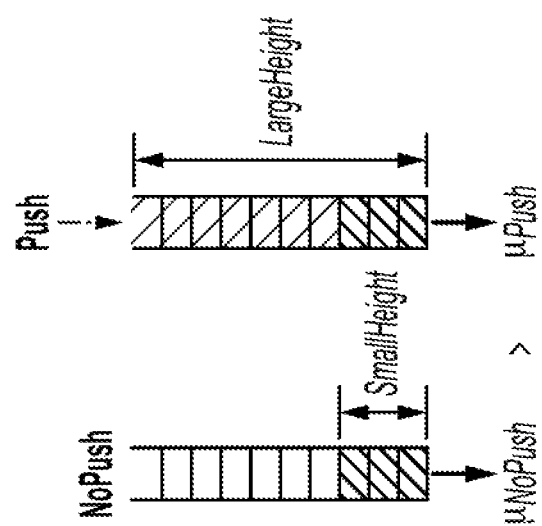
Figures 3, 4:
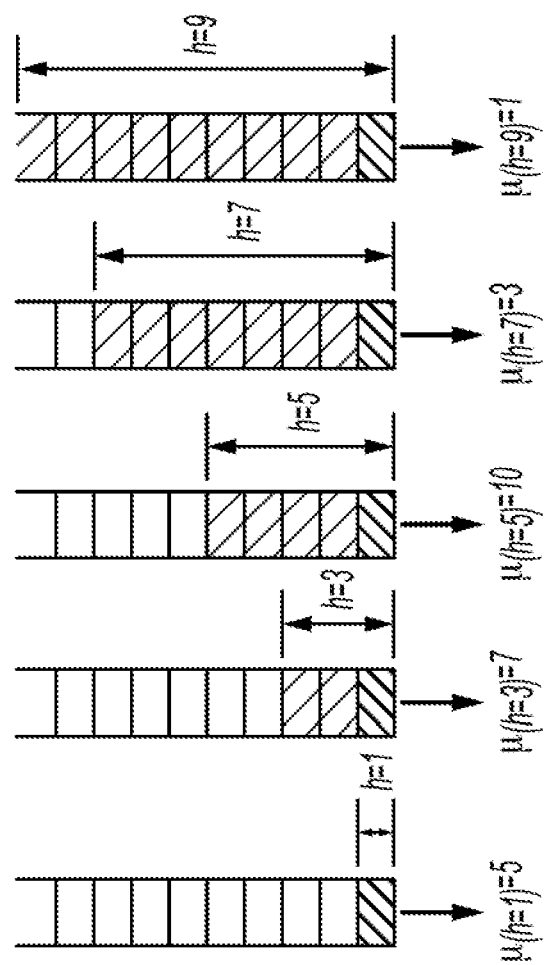
Figure 4:
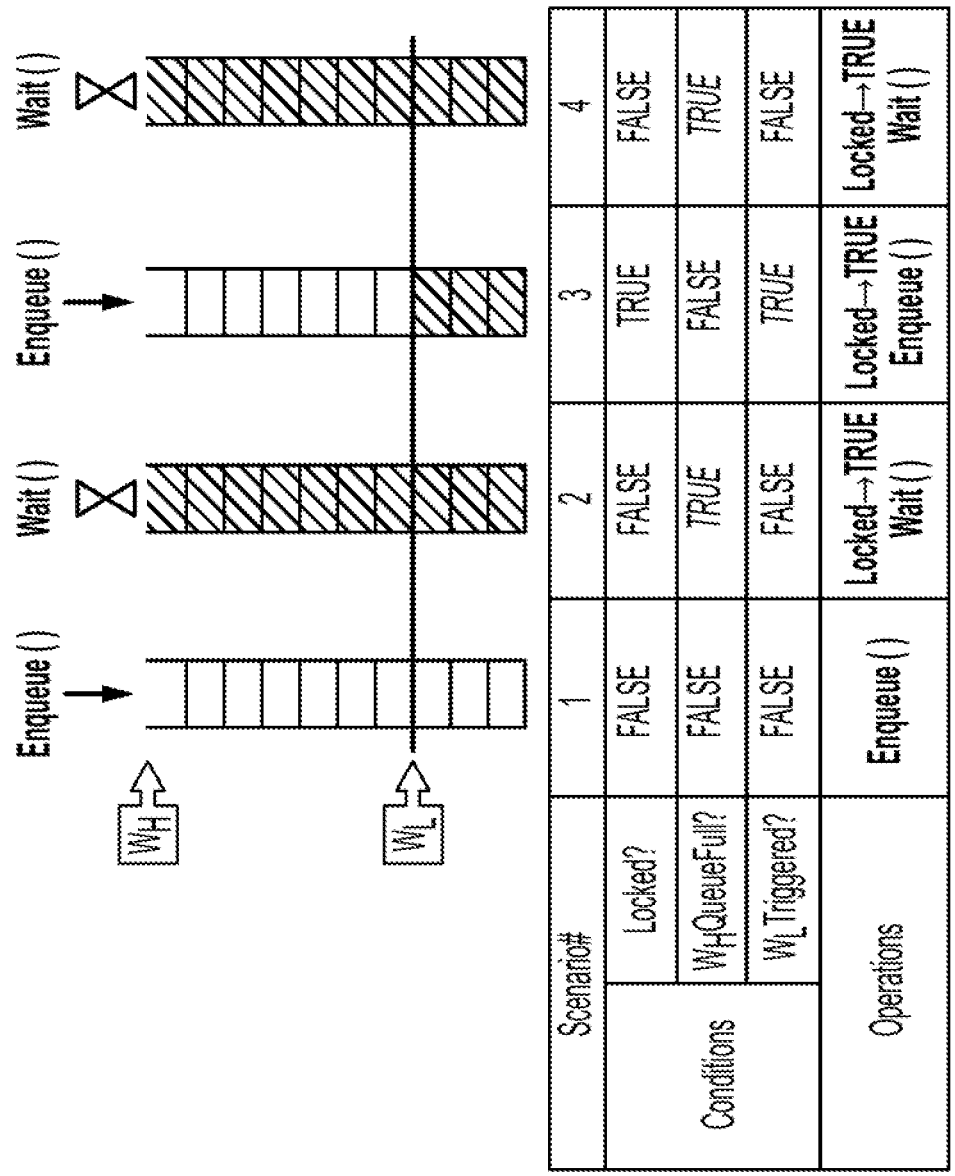
Figures 4, 5, 6:
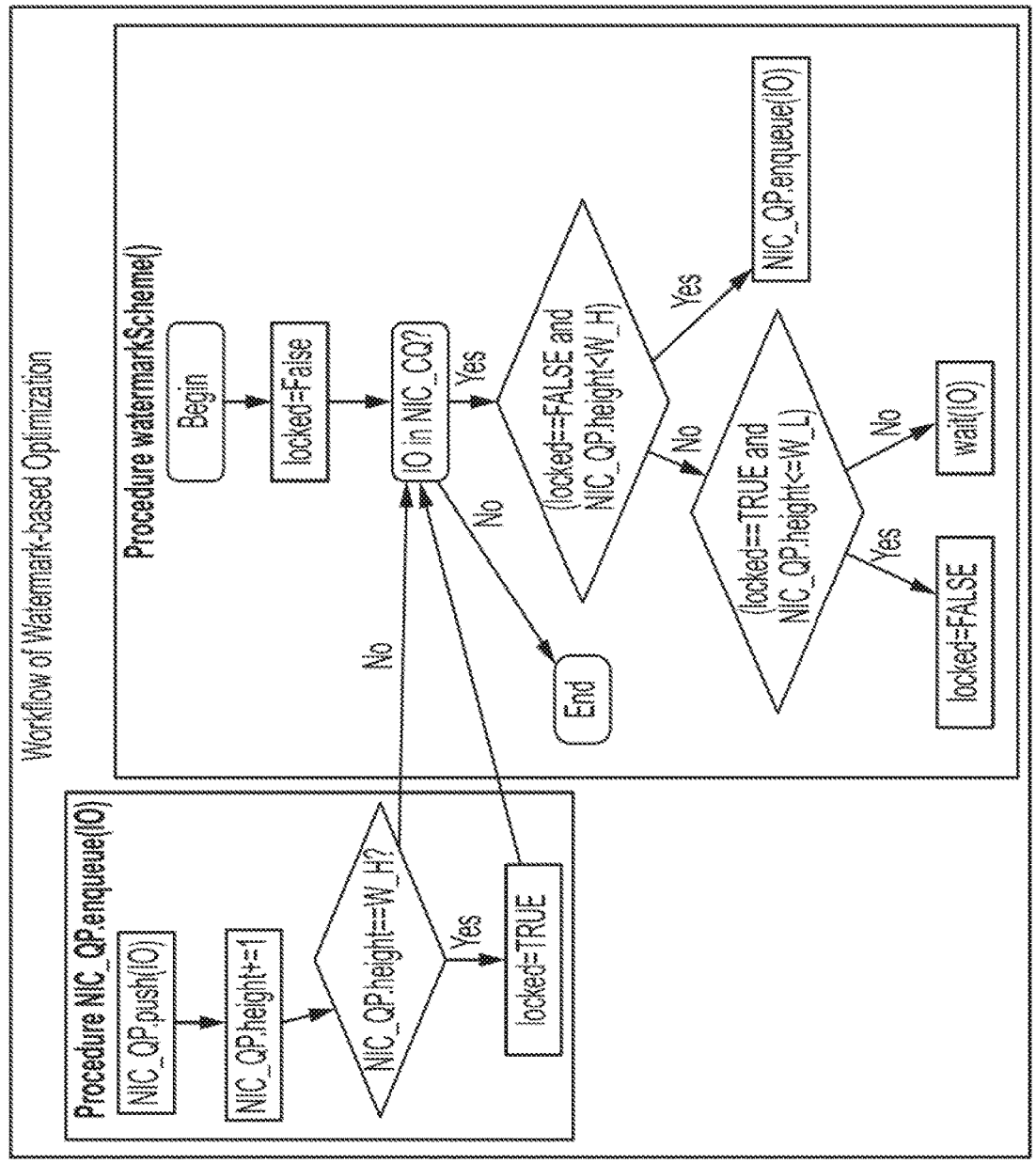
Figures 4, 5, 6, 7:
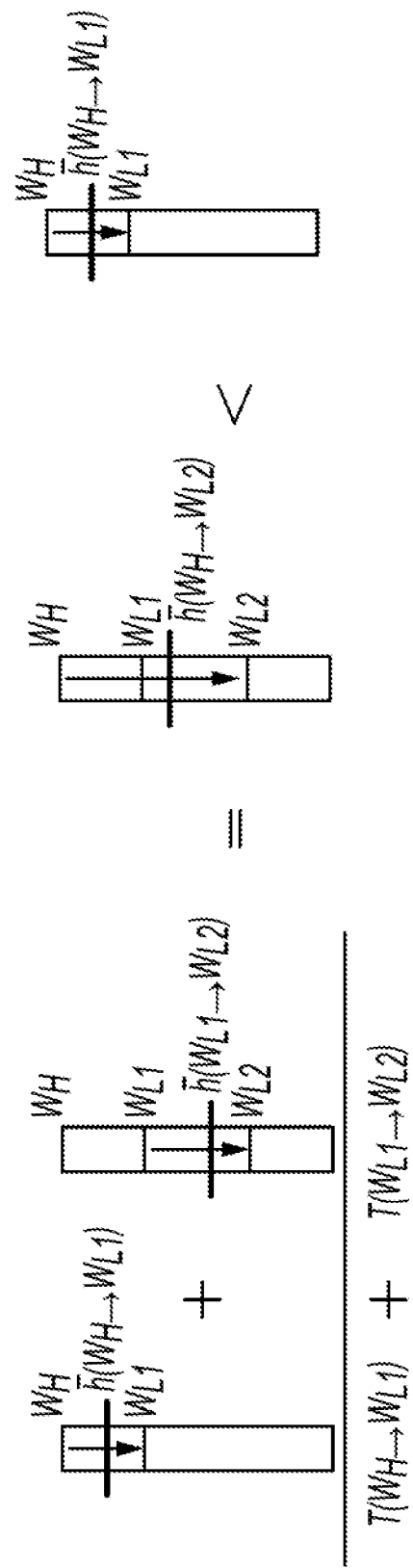
Figures 4, 5, 6, 7, 8:
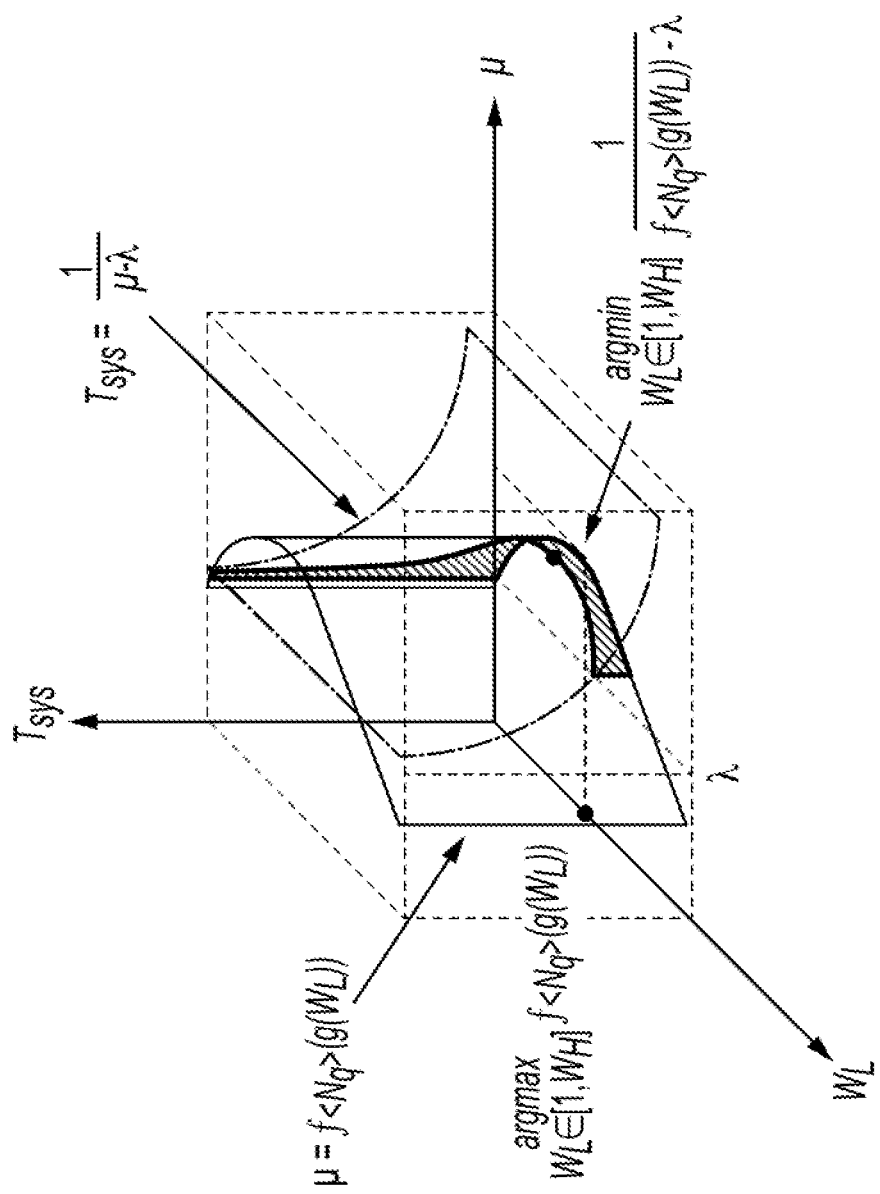

FIG. 4-4 summarizes the conditions and corresponding operations of watermark-based optimization for each queue pair. FIGS. 4-5 and 4-6 further illustrate the basic scheme of a watermark-based optimization. In some embodiments, NVMeQPO uses an I/O flow control method, rather than load balancing or a dispatcher. In fact, any load balancing algorithms can be implemented here, even the very straightforward round robin algorithm.

In detail, for each queue pair, there may be a lock flag called "locked" as shown in line 1 in FIG. 4-5. This flag indicates whether the dispatcher is allowed to assign new I/Os to one single NIC_QP. I/Os are assigned to each NIC-QP in the one-by-one order, and the disclosed systems can break down all the possible scenarios into the following four cases:

Case 1: If the NIC_QP is unlocked and is not full ("full" means $W_H$ is reached), then the disclosed systems enqueue the I/O to the NIC_QP. The "enqueue( )" procedure of the NIC_QP may be called to add the new coming I/O to this NIC_QP, as shown in FIG. 4-4(1) and lines 11~18 in FIG. 4-5.

Case 2: While new I/Os are continuing to be queued in this NIC_QP, NVMeQPO also checks whether the NIC_QP is full. Once it is full, then this NIC_QP may be locked, and no more new I/O requests are allowed to be queued in this NIC_QP (i.e., the "wait( )" procedure may be called) as shown in FIG. 4-4(2) and line 17 in FIG. 4-5. This NIC_QP may wait for $W_H$-$W_L$ queued I/Os to be completed.

Case 3: If the NIC_QP is locked, but the NIC_QP has completed $W_H$-$W_L$ number of queued I/Os (i.e., "WLTriggered" flag if true), then this NIC_QP may be unlocked (line 8 in FIG. 4-5) and may allow new I/Os to be enqueued (line 9 in FIG. 4-5), also seen in FIG. 4-4(3).

Case 4: Similar to case 2, if the NIC_QP is unlocked but is full, then NVMeQPO may be locked and "wait( )" function may be called. This NIC_QP may wait for $W_H$-$W_L$ queued I/Os to be completed.

To sum up, NVMeQP's watermark-based flow control allows the host to add I/Os to the NIC_QP until it is full (i.e., $W_H$ is reached). Once it is full, it may be locked until $W_H$-$W_L$ I/Os are completed. By doing so, NVMeQP can indirectly reduce "QFULL" error number and control the pressure (i.e., the average queued I/O request height, over a long time interval).

The following subsections show how to adjust the value of these two watermarks, and how to dynamically tune $W_L$ to control the I/O flow (arrival pattern) to obtain a high service rate.

4.2.1 High Watermark: Match Upper Bound of Target stack Queue Pair Max Depth

In some embodiments, the queue depths of queue pairs in the client stack are configured to have the same values as those of queue pairs in the target stack. The reason is that unequal queues in client and target stacks may have a high chance to trigger many "QFULL" rejections from the target stack, which may degrade performance significantly. For example, assume $Q_{max}$ (Client) is greater than $Q_{max}$ (Target). Then, over a long time interval, once the maximum queue depth of the target controller is reached, the target storage controller has to reject more incoming commands by returning a costly "QFULL" response to the client stack. Those "QFULL" rejections significantly degrade system performance and can lead to errors on some systems.

Eventually, the service rate of each QP in the client stack decreases from the dispatcher point of view. To avoid such a "QFULL" rejection, the disclosed systems may adjust the controllable upper bound $W_H$ to match QP in the target stack. Such a "matching" process can be done by a straightforward configuration, since the max value of queue pairs in both (i) the client stack ($Q_{max}$ (Target); there sometimes also exists a preset limitation in the client stack) and (ii) the target stack ($Q_{max}$ (Target)) are advertised during the establishment of a connection (i.e., each QP in the client stack may connect to a corresponding QP in the target stack).

Thus:

$$\begin{cases} W_H = \min(Q_{max}(\text{Client}), Q_{max}(\text{Target})) \\ 0 \leq h \leq W_H \\ 0 \leq \overline{h} \leq W_H \\ 1 \leq W_L \leq W_H \end{cases} \quad \text{Eq. 4-1}$$

An example of the first equation is shown in FIG. 4-1, where the $W_H$ is limited to 8 which is the smaller value of $Q_{max}$ (Client) and $Q_{max}$ (Target).

4.2.2 Low Watermark: Control Queue Height and Find Best Service Rate

As mentioned above, it may be hard to directly control the average queued I/O request height in the NIC_QPs, so the disclosed systems may use the low watermark to indirectly achieve this control of the average queued I/O request height in the NIC_QPs.

This subsection first describes the feasibility of doing so, and then introduces an optimization framework to help to find the best service rate. A positive correlation relationship between h and $W_L$ is demonstrated.

In some embodiments, the disclosed systems can regress the function as a monotonically increasing function $\overline{h} \approx g(W_L)$ or directly as $\overline{h} = g(W_L)$ 4.2.2.1 Indirect Control Based on a Positive Correlation Given fixed $N_q$ and $W_H$, the $\mu_{(N_q)}(\overline{h})$ function may be fixed, and the disclosed systems can estimate the average height as a function of $W_L$, as follows.

The average height of queued I/Os of a certain QP may be calculated, for the circumstance when the number of its queued I/Os is dropping, in increments of one from $W_H$ to $W_L$.

Intuitively, it may be the sum of each height with the weight of each height's temporal length, divided by the total time from $W_H$ to $W_L$, as shown in:

$$\overline{h}(W_H \to W_L) = \frac{\sum_{h_i=W_L}^{W_H} (h_i \cdot \tau_{h_i})}{\sum_{h_i=W_L}^{W_H} \tau_{h_i}} = \frac{\sum_{h_i=W_L}^{W_H} \left(h_i \cdot \frac{1}{\mu_{h_i}}\right)}{\sum_{h_i=W_L}^{W_H} \frac{1}{\mu_{h_i}}} \quad \text{Eq. 4-2}$$

Based on Eq. 4-2, the relationship between average height with two different inputs: $W_{L1}$ and $W_{L2}$ ($W_{L1} \leq W_{L2}$), given the same $N_q$ and $W_H$ may be calculated.

The process for the $W_{L2}$ case may be separated into two parts: the first part is from $W_H$ to $W_{L1}$, and the second part is from $W_{L1}$ to $W_{L2}$.

Let:

$$A = \sum_{h_i=W_{L1}}^{W_H} (h_i \cdot \tau_{h_i}), \quad a = \sum_{h_i=W_{L1}}^{W_H} \tau_{h_i}, \quad \text{Eq. 4-3}$$

$$B = \sum_{h_i=W_{L2}}^{W_{L1}} (h_i \cdot \tau_{h_i}), \quad b = \sum_{h_i=W_{L2}}^{W_{L1}} \tau_{h_i}$$

Thus:

$$\overline{h}(W_H \to W_{L1}) = \frac{A}{a}, \text{ and } \overline{h}(W_{L1} - W_{L2}) = \frac{B}{b} \qquad \text{Eq. 4-4}$$

As shown in FIG. 4-7:

$$\overline{h}(W_H \to W_{L1}) = \frac{A}{a} \geq \overline{h}(W_{L1} - W_{L2}) = \frac{B}{b} \qquad \text{Eq. 4-5}$$

Thus:

$$Ab - aB \geq 0 \qquad \text{4-6}$$

Based on Eq. 4-2 and Eq. 4-6:

$$\overline{h}(W_H \to W_{L1}) - \overline{h}(W_H \to W_{L2}) = \frac{\sum_{h_i=W_{L1}}^{W_H}(h_i \cdot \tau_{h_i})}{\sum_{h_i=W_{L1}}^{W_H} \tau_{h_i}} - \frac{\sum_{h_i=W_{L1}}^{W_H}(h_i \cdot \tau_{h_i}) + \sum_{h_i=W_{L2}}^{W_{L1}}(h_i \cdot \tau_{h_i})}{\sum_{h_i=W_{L1}}^{W_H} \tau_{h_i} + \sum_{h_i=W_{L2}}^{W_{L1}} \tau_{h_i}} \qquad \text{Eq. 4-7}$$

$$= \frac{A}{a} - \frac{A+B}{a+b} = \frac{1}{a(a+b)}(Ab - aB) \geq 0$$

Thus, as long as $W_{L1} > W_{L2}$, $\overline{h}(W_H \to W_{L1}) \geq \overline{h}(W_H \to W_{L2})$ holds. That is to say $\overline{h}$ is positively correlated with $W_L$, i.e., $\overline{h} \cong g(W_L)$.

NVMeOQP can regress the monotonically increasing function as $\overline{h} = g(W_L)$ during run time to guide how to use $W_L$ to control average height.

4.2.2.2 Optimization Framework

The disclosed systems may optimize (minimize) $T_{sys}$, i.e., the optimization objective may be to minimize the average latency for I/O in the system (i.e., NIC_CQ and NIC_QP):

min:

$$T_{sys} = \frac{1}{\mu - \lambda} \qquad \text{Eq. 4-8}$$

s.t.:

$W_L \in [I, W_H)$ $W_H = \min(Q_{max}(\text{Client}), Q_{max}(\text{Target}))$ $\frac{\lambda}{\mu} \in [0, 1)$ $\mu = f_{(N_q)}(\overline{h}) \in [0, +\infty)$ $\overline{h} = g(W_L) \in [0, W_H]$ FIG. 4-8 is a plot of an example of the objective function. The intersection of the hyperbolic surfaces $$T_{sys} = \frac{1}{\mu - \lambda}$$

and the service rate vs watermark $W_L$ function $\mu = f(g(W_L))$ may be relevant, as shown in the curve forming the upper boundary of the shaded, curved surface in FIG. 4-8. Since $\mu$ should be greater than to ensure a stable system, the $\mu \geq \lambda$ hyperbola may be used.

The function $\mu = f(g(W_L))$ is concave, so the example curve shown in FIG. 4-8 is also concave. In fact, it is not necessary to limit how the curve appears, since some embodiments do not focus on one single curve shape, but instead strive to find the global minimum of the curve. Similar to Subsection 3.3, the disclosed systems may periodically monitor and regress the curve, and use a greedy algorithm, a gradient descent method, an A* search algorithm, or another machine learning method to find the predetermined operational point. The disclosed systems do not limit the usage of techniques for doing this job.

In some embodiments, the client includes a processing circuit configured to perform some or all of the methods described herein. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present. As used herein, the word "or" is inclusive, so that, for example, "A or B" means any one of (i) A, (ii) B, and (iii) A and B.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for improving the performance of non-volatile memory express over fabrics data storage systems have been specifically described and illustrated herein, many modifications and variations will be apparent to those skilled in the art. Accordingly, it is to be understood that a system and method for improving the performance of non-volatile memory express over fabrics data storage systems constructed according to principles of this disclosure may be embodied other than as specifically described herein. The invention is also defined in the following claims, and equivalents thereof.

What is claimed is:

1. A method for managing input output queue pairs, the method comprising:
   calculating a system utilization ratio, the system utilization ratio being a ratio of:
     an arrival rate of input output requests, to
     a service rate;
   determining that:
     the system utilization ratio has exceeded a first threshold utilization during a duration of a first time period exceeding a first threshold length, and
     adding a new queue pair improves system performance by estimating a change in the service rate according to the new queue pair; and
   adding the new queue pair in response to estimating that the service rate is increased by adding the new queue pair,
   wherein the service rate corresponds to an average processing delay per input output request, and
   wherein the first threshold length is greater than 0.

2. The method of claim 1, further comprising:
   determining that:
     the system utilization ratio has remained below a second threshold utilization during a duration of a second time period exceeding the first threshold length, and
     deleting a queue pair is expected to improve system performance; and
   deleting a queue pair.

3. The method of claim 2, further comprising:
   determining that:
     the system utilization ratio is below the first threshold utilization and above a third threshold utilization; and
   adjusting a lower queue height threshold to be equal to a function of the service rate.

4. The method of claim 3, further comprising:
   determining that:
     a submission queue of a first queue pair of the input output queue pairs is unlocked,
     a centralized queue stores an input output request, and
     a height of the submission queue is less than an upper queue height threshold; and
   enqueueing the input output request.

5. The method of claim 4, further comprising:
   determining that a current height of the submission queue equals the upper queue height threshold; and
   locking the submission queue.

6. The method of claim 3, further comprising:
   determining that a submission queue of a first queue pair of the input output queue pairs is locked;
   determining that a current height of the submission queue does not exceed the lower queue height threshold; and
   unlocking the submission queue.

7. The method of claim 3, wherein the function is a numerically found minimum of a model of the average processing delay per input output request.

8. The method of claim 7, wherein the model is a polynomial fit of historical average processing delays per input output request as a function of the service rate and the lower queue height threshold.

9. The method of claim 2, further comprising:
   determining that a time interval having a length exceeding a second threshold length has elapsed since a most recent use of numerical minimization to determine and set a first number of queue pairs;
   performing numerical minimization of a model of an average processing delay per input output request as a function of the first number of queue pairs, to calculate a second number of queue pairs to be used during operation; and
   adding zero or more new queue pairs or deleting zero or more queue pairs so that the first number of queue pairs is equal to the calculated second number of queue pairs to be used during operation.

10. A system, comprising:
    a processing circuit, and
    one or more persistent storage devices,
    the processing circuit being configured to:
      instantiate one or more input output queue pairs for storing:

input output requests to be sent to the one or more persistent storage devices, and command completions received from the one or more persistent storage devices, calculate a system utilization ratio, the system utilization ratio being a ratio of:

an arrival rate of input output requests, to a service rate;

determine that:

the system utilization ratio has exceeded a first threshold utilization during a duration of a first time period exceeding a first threshold length, and adding a new queue pair improves system performance by estimating a change in the service rate according to the new queue pair; and add the new queue pair in response to estimating that the service rate is increased by adding the new queue pair, wherein the service rate corresponds to an average processing delay per input output request, and wherein the first threshold length is greater than 0.

11. The system of claim 10, wherein the processing circuit is further configured to:

determine that:

the system utilization ratio has remained below a second threshold utilization during a duration of a second time period exceeding the first threshold length, and deleting a queue pair is expected to improve system performance; and delete a queue pair.

12. The system of claim 11, wherein the processing circuit is further configured to:

determine that the system utilization ratio is below the first threshold utilization and above a third threshold utilization; and adjust a lower queue height threshold to be equal to a function of the service rate.

13. The system of claim 12, wherein the processing circuit is further configured to:

determine that:

a submission queue of a first queue pair of the input output queue pairs is unlocked, a centralized queue stores an input output request, and a height of the submission queue is less than an upper queue height threshold; and enqueue the input output request.

14. The system of claim 13, wherein the processing circuit is further configured to:

determine that a current height of the submission queue equals the upper queue height threshold; and lock the submission queue.

15. The system of claim 12, wherein the processing circuit is further configured to:

determine that a submission queue of a first queue pair of the input output queue pairs is locked;

determine that a current height of the submission queue does not exceed the lower queue height threshold; and unlock the submission queue.

16. The system of claim 12, wherein the function is a numerically found minimum of a model of the average processing delay per input output request.

17. The system of claim 16, wherein the model is a polynomial fit of historical average processing delays per input output request as a function of the service rate and the lower queue height threshold.

18. The system of claim 11, wherein the processing circuit is further configured to:

determine that a time interval having a length exceeding a second threshold length has elapsed since a most recent use of numerical minimization to determine and set a first number of queue pairs;

perform numerical minimization of a model of an average processing delay per input output request as a function of the first number of queue pairs, to calculate a second number of queue pairs to be used during operation; and add zero or more new queue pairs or deleting zero or more queue pairs so that the first number of queue pairs is equal to the calculated second number of queue pairs to be used during operation.

19. A system, comprising:

means for processing, and one or more persistent storage devices, the means for processing being configured to:

instantiate one or more input output queue pairs for storing:

input output requests to be sent to the one or more persistent storage devices, and command completions received from the one or more persistent storage devices, calculate a system utilization ratio, the system utilization ratio being a ratio of:

an arrival rate of input output requests, to a service rate;

determine that:

the system utilization ratio has exceeded a first threshold utilization during a duration of a first time period exceeding a first threshold length, and adding a new queue pair improves system performance by estimating a change in the service rate according to the new queue pair; and add the new queue pair in response to estimating that the service rate is increased by adding the new queue pair, wherein the service rate corresponds to an average processing delay per input output request, and wherein the first threshold length is greater than 0.

20. The system of claim 19, wherein the means for processing is further configured to:

determine that:

the system utilization ratio has remained below the first threshold utilization during a duration of a second time period exceeding the first threshold length, and deleting a queue pair is expected to improve system performance; and delete a queue pair.

* * * * *